(12) United States Patent
Ishii et al.

(10) Patent No.: US 8,199,394 B2
(45) Date of Patent: Jun. 12, 2012

(54) MIRCROMIRROR DEVICE HAVING A VERTICAL HINGE

(75) Inventors: Fusao Ishii, Menlo Park, CA (US); Yoshihiro Maeda, Hachioji (JP); Hirotoshi Ichikawa, Hachioji (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 21 days.

(21) Appl. No.: 12/804,112

(22) Filed: Jul. 14, 2010

(65) Prior Publication Data

US 2010/0284057 A1     Nov. 11, 2010

Related U.S. Application Data

(60) Division of application No. 11/894,248, filed on Aug. 18, 2007, now Pat. No. 7,835,062, which is a continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/841,173, filed on Aug. 30, 2006.

(51) Int. Cl.
*G02B 26/08* (2006.01)
*G02B 26/00* (2006.01)

(52) U.S. Cl. ............ 359/224.1; 359/290; 359/295
(58) Field of Classification Search ............ 359/224.1, 359/290, 295
See application file for complete search history.

(56) References Cited

U.S. PATENT DOCUMENTS

| | | |
|---|---|---|
| 5,061,049 A | 10/1991 | Hornbeck |
| 5,673,139 A | 9/1997 | Johnson |
| 5,936,760 A | 8/1999 | Choi et al. |
| 6,128,121 A | 10/2000 | Choi et al. |
| 6,552,840 B2 | 4/2003 | Knipe |
| 6,576,489 B2 | 6/2003 | Leung et al. |
| 6,735,008 B2 | 5/2004 | Brophy et al. |
| 6,856,068 B2 | 2/2005 | Miller et al. |
| 6,859,580 B2 | 2/2005 | Staple et al. |
| 6,891,655 B2 | 5/2005 | Grebinski et al. |
| 7,068,417 B2 | 6/2006 | Yang |
| 7,233,428 B2 | 6/2007 | Yang |
| 2009/0021884 A1* | 1/2009 | Nakamura ............ 361/233 |

* cited by examiner

*Primary Examiner* — William Choi
(74) *Attorney, Agent, or Firm* — Bo-In Lin

(57) ABSTRACT

A mirror device comprises: a plurality of electrodes disposed on a substrate; a hinge connected to at least one of the electrodes; a mirror connected to the hinge and corresponding to at least one of the electrodes, wherein a barrier layer is comprised between the hinge and mirror, and/or between the hinge and electrode. Also noted is a mirror device production method for producing such-configured mirror device. Further noted is a projection apparatus comprising such-configured mirror device.

13 Claims, 24 Drawing Sheets

Fig. 1A (Prior Art)
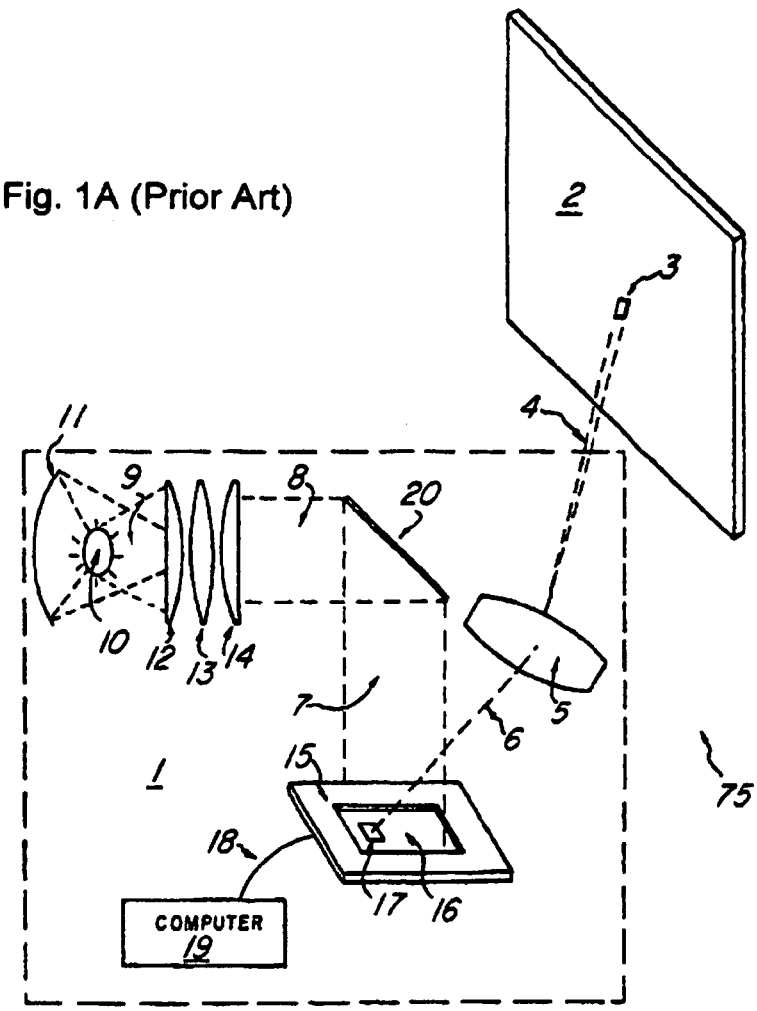
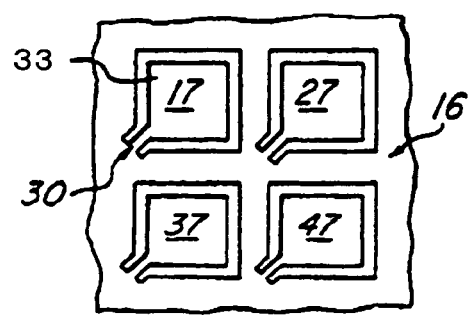
Fig. 1B (Prior Art)

Step 7

Step 8

Step 9

Step 10

Step 11

Step 12

Step 29

Step 30

MIRCROMIRROR DEVICE HAVING A VERTICAL HINGE

CROSS REFERENCE TO RELATED APPLICATIONS

This application is a Divisional Application of a co-pending patent application Ser. No. 11/894,248 filed on Aug. 18, 2007 now U.S. Pat. No. 7,835,062. The application Ser. No. 11/894,248 is a non-provisional Application of a Provisional Application 60/841,173 filed on Aug. 30, 2006 and a Continuation in Part (CIP) Application of a pending U.S. patent application Ser. No. 11/121,543 filed on May 4, 2005 now U.S. Pat. No. 7,268,932. The application Ser. No. 11/121,543 is a Continuation in part (CIP) Application of three previously filed Applications. These three Applications are Ser. No. 10/698,620 filed on Nov. 1, 2003, now abandoned Ser. No. 10/699,140 filed on Nov. 1, 2003, now U.S. Pat. No. 6,862,127 and Ser. No. 10/699,143 filed on Nov. 1, 2003 now U.S. Pat. No. 6,903,860 by one of the Applicants of this Patent Application. The disclosures made in these Patent Applications are hereby incorporated by reference in this Patent Application.

BACKGROUND OF THE INVENTION

1. Field of the Invention

The present invention relates to a special light modulator for modulating light and in particular to mirror device constituted by a mirror element characterized by a hinge supporting the mirror and by an electrode controlling the mirror. It also relates to a production method for such a mirror device and to a projection apparatus comprising such a mirror device.

2. Description of the Related Art

Even though there are significant advances of the technologies for implementing an electromechanical mirror device as a spatial light modulator (SLM) in recent years, there are still limitations and difficulties when it is employed to provide a high quality image. Specifically, when the images are digitally controlled, the image quality is adversely affected due to the fact that the images are not displayed with a sufficient number of gray scales.

An electromechanical mirror device is drawing a considerable interest as a spatial light modulator (SLM). The electromechanical mirror device consists of a "mirror array" arranging a large number of mirror elements. In general, the mirror elements ranging from 60,000 to several millions of pieces are arranged on a surface of a substrate in an electromechanical mirror device.

Referring to FIG. 1A, an image display system 1 including a screen 2 is disclosed in a reference U.S. Pat. No. 5,214,420. A light source 10 is used for generating light energy for illuminating the screen 2. The generated light 9 is further concentrated and directed toward a lens 12 by a mirror 11. Lenses 12, 13 and 14 form a beam columnator operative to columnate light 9 into a column of light 8. A spatial light modulator (SLM) 15 is controlled on the basis of data input by a computer 19 via a bus 18 and selectively redirects the portions of light from a path 7 toward an enlarger lens 5 and onto screen 2. The SLM 15 has a mirror array arraying switchable reflective elements 17, 27, 37, and 47 being consisted of a mirror 33 connected by a hinge 30 on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is not redirected toward screen 2 and hence the pixel 3 is dark.

Each of mirror elements constituting a mirror device is to function as spatial light modulator (SLM) and each mirror element comprises a mirror and electrodes. A voltage applied to the electrode(s) generates a coulomb force between the mirror and the electrode(s), thereby making it possible to control and incline the mirror, and the mirror is "deflected" according to a common term used in this specification for describing the operational condition of a mirror element.

When a mirror is deflected by a voltage applied to the electrode(s) for controlling the mirror, the deflected mirror also changes the direction of the reflected light in reflecting the incident light. The direction of the reflected light is changed in accordance with the deflection angle of the mirror. The present specification refers to a state of the mirror when the light of which almost the entirety of the incident light is reflected to a projection path designated for image display as an "ON light", while it refers to the light reflected to a direction other than the designated projection path for image display as an "OFF light".

And a state of the mirror that reflects the light of the incident light in a manner that the ratio of the light, which is reflected to a projection path (i.e., the ON light), to that which is reflected so as to shift from the projection path (i.e., the OFF light) is referred to as a specific ratio. And that the light reflected to the projection path with a smaller quantity of light than the state of the ON light is referred to as an "intermediate light".

The terminology of present specification defines an angle of rotation along a clockwise (CW) direction as a positive (+) angle and that of counterclockwise (CCW) direction as negative (−) angle. A deflection angle is defined as zero degree (0°) when the mirror is in the initial state, as a reference of mirror deflection angle.

Most of the conventional image display devices such as the devices disclosed in a U.S. Pat. No. 5,214,420 implements a dual-state mirror control that controls the mirrors in a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as a control related to the ON or OFF state. Since the mirror is controlled to operate in either the ON or OFF state, the conventional image projection apparatus has no way to provide a pulse width for controlling the mirror that is shorter than the control duration allowable on the basis of the LSB. The least quantity of light, which is determined on the basis of the gray scale, is the light reflected during the time duration based on the least pulse width. The limited number of gray scales leads to a degradation of the image.

Specifically, FIG. 1C exemplifies a control circuit for controlling a mirror element according to the disclosure in the U.S. Pat. No. 5,285,407. The control circuit includes a memory cell 32. Various transistors are referred to as "M*", where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based on a Static Random Access switch Memory (SRAM) design. The transistor M9 connected to a Row-line receives a data signal via a Bit-line. The memory cell 32 written data is accessed when the transistor M9 that has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

The mirror is driven by a voltage applied to the address electrode abutting an address electrode and is held at a predetermined deflection angle on the address electrode. An elastic "landing chip" is formed at a portion on the address electrode, which makes the address electrode contact with mirror, and assists the operation for deflecting the mirror toward the opposite direction when a deflection of the mirror is switched. The landing chip is designed as having the same potential with the address electrode, so that a shorting is prevented when the address electrode is in contact with the mirror.

Each mirror formed on a device substrate has a square or rectangular shape and each side has a length of 10 to 15 μm. However, in this configuration, an unexpected reflected light for projecting image is generated by reflection on the substrate of incident light through the gap between adjacent mirrors. The contrast of an image display generated by adjacent mirrors is degraded due to the reflections generated not by the mirrors but by the gaps between the mirrors. As a result, a quality of the image display is degraded. In order to overcome such problems, the mirrors are arrayed on a semiconductor wafer substrate with a layout to minimize the gaps between the mirrors. One mirror device is generally designed to include an appropriate number of mirror elements wherein each mirror element is manufactured as a deflectable mirror on the substrate for displaying a pixel of an image. The appropriate number of elements for displaying an image is in compliance with the display resolution standard according to a VESA Standard defined by Video Electronics Standards Association or television broadcast standards. In the case of the mirror device comprising a plurality of mirror elements corresponding to Wide eXtended Graphics Array (WXGA), whose resolution is 1280 by 768, defined by VESA, the pitch between the mirrors of the mirror device is 10 μm and the diagonal length of the mirror array is about 0.6 inches.

The control circuit as illustrated in FIG. 1C controls the mirrors to switch between two states and the control circuit drives the mirror to oscillate in either the ON or OFF deflected angle (or position).

The minimum quantity of light controllable to reflect from each mirror element for image display, i.e., the resolution of gray scale of image display for a digitally controlled image projection apparatus, is determined by the least length of time that the mirror is controllable to hold at the ON position. The length of time that each mirror is controlled to hold at an ON position is in turn controlled by multiple bit words. FIG. 1D shows the "binary time periods" in the case of controlling an SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the Pulse Width Modulation (PWM) control mechanism, the minimum quantity of light that determines the resolution of the gray scale is a brightness controlled by using the "least significant bit" for holding the mirror at an ON position during a shortest controllable length of time.

In a simple example with n-bit word for controlling the gray scale, one frame time is divided into $(2^n-1)$ equal time slices. If one frame time is 16.7 msec., each time slice is $16.7/(2^n-1)$ msec.

Having set these time lengths for each pixel in each frame of the image, the quantity of light in a pixel which is quantified as "0" time slices is black (i.e., no quantity of light), "1" time slice is the quantity of light represented by the LSB, and 15 time slices (in the case of n=4) is the quantity of light represented by the maximum brightness. Based on the light being quantified, the time of mirror being held at the ON position during one frame period is determined by each pixel. Thus, each pixel with a quantified value which is more than "0" time slice is displayed for the screen by the mirror being held at the ON position with the number of time slices corresponding to its quantity of light during one frame period. The viewer's eye integrates the brightness of each pixel in such a manner that the image is displayed as if the image were generated with analog levels of light.

For controlling deflectable mirror devices, the PWM calls for the data to be formatted into "bit-planes", where each bit-plane corresponds to a bit weight of the quantity of light. Thus, when the brightness of each pixel is represented by an n-bit value, each frame of data has the n-bit planes. Then, each bit-plane has a "0" or "1" value for each mirror element. In the PWM described in the preceding paragraphs, each bit-plane is independently loaded and the mirror elements are controlled on the basis of bit-plane values corresponding to them during one frame. For example, the bit-plane representing the LSB of each pixel is displayed as a "1" time slice.

When adjacent image pixels are displayed with a very coarse gray scales caused by great differences of quantity of light, thus, artifacts are shown between these adjacent image pixels. That leads to the degradations of image qualities. The degradations of image qualities are specially pronounced in bright areas of image when there are "bigger gaps" of gray scale, i.e. quantity of light, between adjacent image pixels. The artifacts are caused by a technical limitation that the digitally controlled image does not obtain a sufficient number of gray scales, i.e. the levels of the quantity of light.

The mirrors are controlled either at the ON or OFF position. Then, the quantity of light of a displayed image is determined by the length of time each mirror is held, which is at the ON position. In order to increase the number of levels of the quantity of light, the switching speed of the ON or OFF positions for the mirror must be increased. Therefore the digitally control signals need be increased to a higher number of bits. However, when the switching speed of the mirror deflection is increased, a stronger hinge for supporting the mirror is necessary to sustain a required number of switches of the ON or OFF positions for the mirror deflection. Furthermore, in order to drive the mirrors provided with a strengthened hinge to the ON or OFF position, applying a higher voltage to the electrode is required. The higher voltage may exceed twenty volts and may even be as high as thirty volts. The mirrors produced by applying the CMOS technologies probably is not appropriate for operating the mirror at such a high range of voltages, and therefore the DMOS mirror devices may be required. In order to achieve a control of a higher number of gray scales, a more complicated production process and larger device areas are required to produce the DMOS mirror. Conventional mirror controls are therefore faced with a technical problem that the good accuracy of gray scales and range of the operable voltage have to be sacrificed for the benefits of a smaller image projection apparatus.

There are many patents related to the control of quantity of light. These Patents include the U.S. Pat. Nos. 5,589,852, 6,232,963, 6,592,227, 6,648,476, and 6,819,064. There are further patents and patent applications related to different sorts of light sources. These Patents include the U.S. Pat. Nos. 5,442,414, 6,036,318 and Application 20030147052. Also, The U.S. Pat. No. 6,746,123 has disclosed particular polarized light sources for preventing the loss of light. However, these patents or patent applications do not provide an effective solution to attain a sufficient number of gray scales in the digitally controlled image display system.

Furthermore, there are many patents related to a spatial light modulation that includes the U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions do not provide a direct solution for a person skilled in the art to overcome the above-discussed limitations and difficulties.

In view of the above problems, an invention has disclosed a method for controlling the deflection angle of the mirror to express higher number of gray scales of an image in a US Patent Application 20050190429. In this disclosure, the quantity of light obtained during the oscillation period of the mirror is about 25% to 37% of the quantity of light obtained during the mirror is held on the ON position at all times.

According to such control, it is not particularly necessary to drive the mirror at high speed. Also, it is possible to provide a higher number of gray scales using a low elastic constant of the hinge that supports the mirror. Hence, such control makes it possible to reduce the voltage applied to the address electrode.

An image projection apparatus using the mirror device described above is broadly categorized into two types, i.e., a single-plate image projection apparatus implemented with only one spatial light modulator and a multi-plate image projection apparatus implemented with a plurality of spatial light modulators. In the single-plate image projection apparatus, a color image is displayed by changing in turn the colors, i.e. frequency or wavelength of projected light is changed by time. In a multi-plate image projection apparatus, a color image is displayed by allowing the spatial light modulators corresponding to beams of light having different colors, i.e. frequencies or wavelengths of the light, to modulate the beams of light; and combined with the modulated beams of light at all times.

In these days, high resolutions such as a full high-definition (Full HD: 1920 by 1080 pixels) are required on the filed of a projection apparatus, prompting the design and development of a higher resolution display.

A mirror device used in such a projection apparatus is constituted by a mirror array arraying one to two million mirror elements in a two-dimensional array.

The size of a mirror of the mirror element of a common mirror device is a square of 11 µm. The wiring process rule of a CMOS circuit unit of a memory cell for driving the mirror is configured to be 0.25 µm. The mirror is controlled by setting the operating voltage of the memory cell or mirror drive voltage, which is set to more than twenty volts. Such a mirror is supported by an elastic hinge.

A common mirror device used for a Full High Definition (Full-HD) is the diagonal size of 24.13 mm (0.95 inches), with the mirror pitch of 11 µm. An eXtended Graphics Array (XGA)-size mirror device has the diagonal size of 17.78 mm (0.7 inches) of the mirror array, with the mirror pitch of 14 µm.

FIG. 2 is a diagonal view of a mirror device arraying, in two-dimension on a device substrate, mirror elements controlling a reflection direction of incident light by deflecting the mirror.

The mirror device 200 shown in FIG. 2 is constituted by arraying a plurality of mirror elements, each mirror element 300 is constituted by address electrode (not shown in a drawing herein), elastic hinge (not shown in a drawing herein) and a mirror supported by the elastic hinge, lengthwise and crosswise (in two-dimension) on a device substrate 303. FIG. 2 illustrates a case of arraying a plurality of mirror elements respectively comprising square mirrors 302 lengthwise and crosswise at a constant interval on the device substrate 303. The mirror 302 of one mirror element 300 is controlled by applying a voltage to the address electrode provided on the device substrate 303.

And a deflection axis 201 for deflecting the mirror 302 is indicated by the dotted line. The light emitted from a light source 301 is incident to the mirror 302 so as to be orthogonal or diagonal to the deflection axis 201.

Note that the present specification document calls the distance between the deflection axes of adjacent mirrors 302 as pitch and the distance between the respective sides of the present mirror and adjacent mirror 302 as gap.

The following is a description on an operation of one mirror element 300 by referring to the cross-sectional line II-II of the one mirror element 300 of the mirror device 200 shown in FIG. 2.

FIGS. 3A and 3B are cross-sectional diagrams of one mirror element in the line II-II of the mirror device shown in FIG. 2.

The one mirror element 300 comprises a mirror 302, an elastic hinge 304 supporting the mirror 302, address electrodes 307a and 307b, and two memory cells including a first memory cell and a second memory cell both for applying a voltage to the address electrodes 307a and 307b in order to control the mirror 302 under a desired deflection state. The drive circuits for the respective memory cells are provided in the inside of the device substrate 303 so that a control of each memory cell based on the signal of image data makes it possible to control the deflection angle of the mirror 302, and modulate and reflect the incident light.

FIG. 3A is a cross-sectional diagram of a mirror element reflecting incident light to a projection optical system by deflecting the mirror.

An application of a signal (0, 1) to a memory cell applies a voltage of "0" volt to the address electrode 307a and that of Va volts to the address electrode 307b, both shown in FIG. 3A. As a result, the mirror 302 is drawn by a coulomb force and deflected from the horizontal state to the direction of the address electrode 307b to which a voltage of Va volts is applied. This results in reflecting the incident light on the mirror 302 to the projection optical system (which is called an ON light state). Note that an insulation layer 306 is applied onto the device electrode 303, and a hinge electrode 305 connected to the elastic hinge 304 is grounded through a Via (not shown in a drawing herein) disposed in the insulation layer 306.

FIG. 3B is a cross-sectional diagram of a mirror element not reflecting the incident light to the projection optical system by deflecting the mirror.

An application of a signal (1, 0) to a memory cell applies a voltage of Va volts to the address electrode 307a and that of "0" volt to the address electrode 307b. As a result, the mirror 302 is drawn by a coulomb force and deflected from the horizontal state to the direction of the address electrode 307a to which a voltage of Va volts is applied. This results in reflecting the incident light to the outside of the projection optical system (which is called an OFF light state).

Incidentally, the coulomb force generated between the mirror 302 and address electrode 307a, or 307b, is expressed by the following expression:

$$F = k'e\, SV^2/2h^2 \qquad (1);$$

where S is the area size of the address electrode 307a or 307b, h is the distance between the mirror 302 and address electrode 307a or 307b, e is the permittivity between the mirror 302 and address electrode 307a or 307b, V is the voltage applied to the address electrode 307a or 307b, and k' is a correction coefficient.

FIG. 4 is a cross-sectional diagram exemplifying a situation of operating each mirror element disposed on the device substrate shown in FIG. 2.

An independent operation of the each mirror element 300 in the ON light state or OFF light state as shown in FIGS. 3A and 3B controls the direction of reflection of the incident light. Here, the incident light to the side edges of the mirror 302 is diffused to directions other than the desired direction when the light is reflected. And the incident light going through the gap between the adjacent mirrors 302 is reflected on the device substrate 303, thus generating an extraneous reflection light.

Meanwhile, in the mirror 302 illuminated by the incident light, a diffraction light is generated in a direction orthogonal to each side of the mirror 302. If these components of diffusion light and extraneous diffraction light enter the eye of the projection lens of the projection apparatus, the contrast of an image is degraded.

A few characteristic mirrors 302 are disclosed as the mirrors 302 of such mirror elements 300 of the above described mirror device 200.

One example is a U.S. Pat. No. 6,128,121 disclosing a mirror comprising an opening part at the center of the support layer of the mirror, on which a reflection member is layered.

Such a mirror 302, however, comprising the opening part at the center of the support layer, allows a small step nearby the opening part of the layered reflection member. This step allows a generation of an extraneous diffraction light from the center of the mirror 302. And the diffraction light entering the projection lens 309 causes the problem of degrading the contrast of an image.

FIG. 5 illustrates a mirror comprising an opening part at the center of the support layer of the mirror 302, on which a reflection member is layered. Note that this delineates by emphasizing a step 552 of the reflection member at the center.

An illumination, on the step 552 nearby the opening part of the mirror 302, of the light 551 emitted from the light source 301 generates diffraction light 553 in a direction orthogonal to a side orthogonal to a direction of light illuminated on the step 552 of the opening. And the incidence of the diffraction light 553 to the projection lens degrades the contrast of an image. Therefore, the mirror must be designed by considering such an influence of the diffraction light 553.

The mirror device as described above can normally be produced through a process similar to the production process for a semiconductor. The production process primarily includes chemical vapor deposition (CVD), photolithography, etching, doping, chemical mechanical polishing (CMP), et cetera.

Next, in order to respond to a high resolution projection apparatus, the number of mirror elements must also be increased, requiring a miniaturization of a mirror size of the mirror element. An increase of the number of mirror elements without miniaturizing the mirror size enlarges the size of the mirror array proportionately with the number of mirror elements. And brought about is a problem of an enlarged mirror device enlarging the entirety of the optical system of the projection apparatus, resulting in enlarging the projection apparatus per se. Therefore, an important challenge for solving the problem of enlarged projection apparatus associated with the high resolution projection apparatus is a response to the miniaturization of the mirror size of a mirror element.

Also required for miniaturizing the mirror size is a miniaturization of the memory cell and structure body disposed under the mirror. For miniaturizing the memory cell, the wiring process rule for a MOS circuit of the memory cell also needs to be miniaturized. Once the wiring process rule is miniaturized, the operating voltage of an FET transistor or such is decreased, and a voltage applicable to an individual address electrode for controlling the deflection of a mirror is decreased. If the deflection of a mirror is controlled in such a configuration without improving an elastic hinge, a voltage to be applied to the address electrode needs to be increased in order to control the deflection of the mirror. Consequently ushered in is a problem such as a circuit formed in the device substrate (e.g., the withstand voltage of a transistor, the capacitance of a DRAM capacitor, et cetera) needing to be increased for increasing the voltage to be applied to the address electrode. In order to solve such a problem, the elastic hinge also needs to be miniaturized. The elastic hinge, however, is very thin and small as compared to the mirror, requiring a consideration for the endurance against a repetition of usages as well as considerations for the method of supporting the mirror and for the endurance against usage environments and temperature changes in order to achieve a miniaturization of the elastic hinge, thus a difficulty accompanies the miniaturization of the elastic hinge.

Meanwhile, an enforcement of a restitution force of the elastic hinge makes it possible to speed up the deflecting operation of the mirror. A speedier deflection control enables a minute adjustment of a light intensity and an obtainment of a higher level-gray scale of an image. A reinforcement of the elastic hinge for an improved restitution force thereof (e.g., increasing the thickness of the elastic hinge), however, requires an increased voltage to be applied to the address electrode, requiring a larger area size thereof. In terms of this point, the elastic hinge is conventionally placed at the center of a mirror, thus limiting the design of a mirror element, such as the form and area size of the address electrode, and therefore a hurdle exists in enlarging the area size of the address electrode as well.

The following lists reference patent documents related to the structures of conventional mirror devices and the technique for producing such mirror devices.

U.S. Pat. No. 5,214,420: this document has disclosed a structure of a mirror device.

U.S. Pat. No. 5,936,760: this document has disclosed a mirror device implemented with a hinge by putting a hole in the sacrifice layer.

U.S. Pat. No. 6,929,969, No. 5,083,857, No. 5,526,951, and No. 20020024641: these documents have disclosed production methods for a mirror device.

U.S. Pat. Nos. 5,673,139 and 7,233,428: these documents have disclosed structures of a vertical hinge of a mirror element.

U.S. Pat. No. 6,735,008: this document has disclosed a mirror device equipped with a vertical hinge.

U.S. Pat. No. 6,552,840: this document has disclosed a mirror device equipping a step on an electrode surface.

U.S. Pat. No. 5,504,614: this document has disclosed a method of an ion implant to a hinge layer when producing a mirror device.

U.S. Pat. No. 4,566,935: this document has disclosed a method for removing a sacrifice layer when producing a mirror device.

U.S. Pat. No. 6,942,811 and No. 6,800,210: these documents have disclosed etching methods when producing a mirror device.

U.S. Pat. No. 5,817,569, No. 6,900,072, No. 6,686,291 and No. 6,787,187: these documents have disclosed methods of dicing when producing a mirror device.

SUMMARY OF THE INVENTION

A purpose of the present invention is to configure a mirror device comprising a mirror element overcoming the above noted problem. Another purpose is to produce such a mirror device. Yet another purpose is to provide a projection apparatus comprising such a mirror device.

A first aspect of the present invention is to provide a mirror device, comprising: a plurality of electrodes equipped on a substrate; a hinge connected to at least one of the electrodes; a mirror connected to the hinge and corresponding to at least one of the electrodes, wherein a barrier layer is comprised between the hinge and mirror, and/or between the hinge and electrode.

A second aspect of the present invention is to provide a projection apparatus, comprising: a mirror device comprising a plurality of mirror elements reflecting the light emitted from a light source; and a projection optical system for projecting the light reflected by the mirror device, wherein the mirror device comprises a mirror for reflecting the light, a hinge for supporting the mirror, a substrate for supporting the hinge, a hinge electrode equipped within the substrate and electrically conductive to the hinge, a control circuit including a capacitor placed in the inside of the substrate, and an electrode connected to the control circuit.

A third aspect of the present invention is to provide a mirror device production method, comprising the steps of: forming a circuit and a wiring on a substrate; forming an electrode connected to both the wiring and the circuit on the substrate, forming a sacrifice layer on the surfaces of the substrate and electrode, putting a hole from the surface of the sacrifice layer to the electrode, forming a hinge layer in the hole which has been put and on the sacrifice layer, etching the hinge layer by using a mask, forming a barrier layer on the etched hinge layer, forming a mirror layer on the hinge layer and barrier layer, and forming a protective layer on the mirror layer by employing a chemical vapor deposition (CVD).

BRIEF DESCRIPTION OF THE DRAWINGS

FIG. 1A shows a prior art illustrating the basic principle of a projection display using a micromirror device;

FIG. 1B shows a prior art illustrating the basic principle of a micromirror device used for a projection display;

DESCRIPTION OF THE PREFERRED EMBODIMENTS

Reference is now made to the above listed Figures for the purpose of describing, in detail, the preferred embodiments of the present invention. The Figures referred to and the accompanying descriptions are provided only as examples of the invention and are not intended in anyway to limit the scope of the claims appended to the detailed description of the embodiment.

In an exemplary embodiment, this invention discloses a mirror device, comprising: a plurality of electrodes equipped on a substrate; a hinge connected to at least one of the electrodes; a mirror connected to the hinge and corresponding to at least one of the electrodes, wherein a barrier layer is comprised between the hinge and mirror, and/or between the hinge and electrode. Also noted is a mirror device production method for producing such-configured mirror device. Further noted is a projection apparatus comprising such-configured mirror device.

The following is a description of the structure and operation of a mirror element of a mirror device according to the present embodiment, the production method of the mirror device according to the present embodiment and a projection apparatus comprising the mirror device according to the present embodiment.

Embodiment 1

Figure 6:
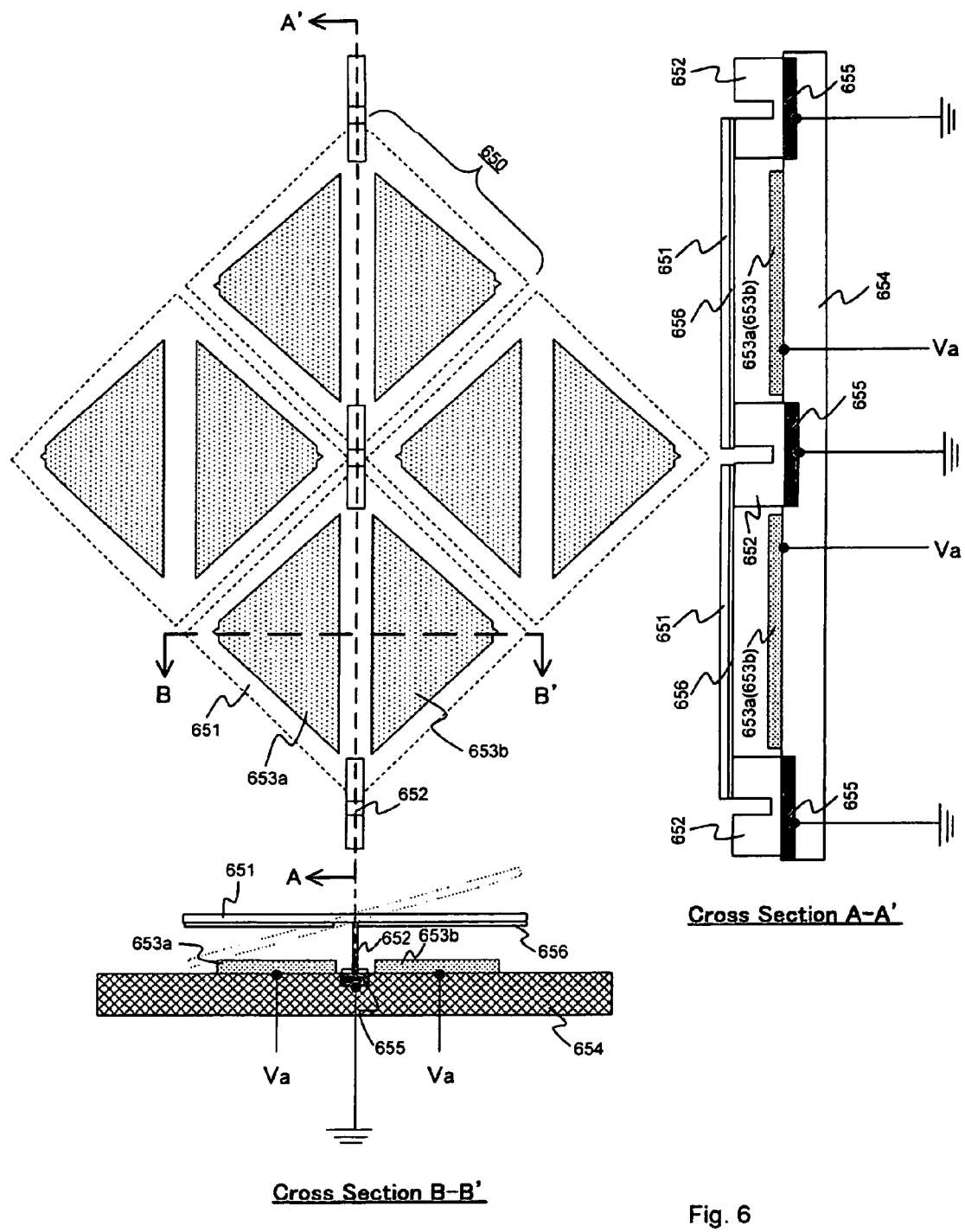
FIG. 6 is a plain view diagram, and a cross-sectional diagram, of a mirror element of a mirror device according to a preferred embodiment 1.

FIG. 6 is plain view and cross-sectional diagrams of a mirror element of a mirror device according to a preferred embodiment 1.

The top left drawing of FIG. 6 is the plain view of four mirror elements 650 of a mirror device according to the embodiment 1.

The first is a description on the configuration of each mirror element 650 shown in FIG. 6.

A mirror 651 of each mirror element 650 shown in FIG. 6 is formed as an approximate square such as square and parallelogram as an example. The length of each of four sides of the mirror 651 is preferably between approximately 4 to 10 μm. An application of a voltage to address electrodes 653a and 653b generates a coulomb force to draw the mirror 651 and deflects it on the basis of a deflection axis. This results in enabling a change of directions of reflecting the light illuminated on the mirror 651. Note that FIG. 6 indicates the mirror 651 of each mirror element by the dotted lines. And there is a layer called a support layer 656 under the mirror 651 and the layer is connected to an elastic hinge 652. The support layer 656 may alternatively be placed only in the connection part with the elastic hinge 652 in place of the entire surface under the mirror 651. Also, a connection member made from titanium (Ti), tungsten (W), tantalum (Ta) or such may alternatively be equipped between the elastic hinge 652 and support layer 656. The material of the mirror is preferably made of aluminum (Al) that is a reflection member.

The elastic hinge 652 is shared between an edge part of a mirror 651 and that of a mirror adjacent to the present mirror 651, and connected to the support layers 656 of both mirrors 651. The elastic hinge 652 shared in the configuration of FIG. 6 is equipped in proximity to the deflection axes of the respective mirrors 651 having the deflection axes in the same direction. The elastic hinge 652 is featured with a groove in a gap part between the individual mirrors 651. Such a configuration absorbs an extraneous force as a result of the grooved part of the elastic hinge 652 deforming when one mirror 651 of the two sharing the elastic hinge 652 is deflected, thereby practically eliminating an influence of the deflection to the other mirror 651 sharing the elastic hinge 652. Therefore, it is possible to control the individual mirrors 651 independently even if they share the elastic hinge 652. The elastic hinge 652 is preferably to be placed in a manner to maximize and equalize the area sizes of the address electrodes 653a and 653b on the left and right sides of the deflection axis of the mirror 651.

The material of the elastic hinge 652 is preferably an elastomer including silicon (Si), such as amorphous silicon (a-Si) and single crystal silicon, and may further be configured as a conductive hinge by doping with arsenic or phosphorus. A same material as the support layer 656 is preferred.

Furthermore, the elastic hinge 652 is equipped on a hinge electrode 655 shared by the end part of the mirror 651 and the end part of a mirror adjacent to the present mirror 651, as a hinge structural body for supporting the elastic hinge 652. The hinge electrode 655 is grounded. Note that the hinge structural body for supporting the elastic hinge 652 may alternatively be equipped separately from the hinge electrode 655.

The address electrodes 653a and 653b are placed under the mirror 651. An application of a voltage to the address electrodes 653a and 653b generates a coulomb force between the mirror 651 and address electrode 653a, or 653b, thereby making it possible to deflect the mirror 651 in a desired direction. Conventionally, an elastic hinge 652 is formed nearby the center part of a mirror 651, requiring a placement of the address electrodes 653a and 653b so as to avoid the elastic hinge 652, and therefore the form and placement of the address electrodes 653a and 653b have been limited. Whereas the present embodiment 1 is configured to connect the elastic hinge 652 so as to share the end part of the mirror 651 and that of the adjacent mirror 651, thereby making it possible to use the vicinity of the center part under the mirror 651. This allows a placement of the address electrodes 653a and 653b in a free form nearby the center part, increasing the freedom of the design of the mirror element 650. This makes it possible to increase the area size of the address electrodes 653a and 653b by using the vicinity of the center part under the mirror 651 and therefore increase the coulomb force necessary for deflecting the mirror 651. This results in decreasing the voltage to be applied to the address electrodes 653a and 653b for deflecting the mirror 651. In the case of being enabled to control the mirror 651 with a low voltage while keeping the coulomb force at the same level, a DRAM circuit as control circuit for the mirror 651 can be made more compact. Therefore, the mirror element 650 can be made more compact. Moreover, it is possible to control the mirror 651 by a low volt, thus reducing the power consumption for controlling the mirror device.

Incidentally, the configuration shown in FIG. 6 is such that the address electrodes 653a and 653b placed on the left and right sides under the mirror 651 are formed practically as a triangle, with the area size thereof being the same. Here, the form of the mirror 651, the form of the elastic hinge 652, the form and height of the address electrodes 653a and 653b, and such, may be appropriately modified, and they may not necessarily be configured to be symmetrical about the deflection axis of the mirror.

The top right drawing of FIG. 6 is a diagram of a side view of the cross-section of the line A-A' indicated in the plain view diagram of the mirror element shown in the top left drawing of FIG. 6.

The mirror 651 is supported by the support layer 656, which is connected to the elastic hinge 652 that is shared with the adjacent mirror 651. That is, the elastic hinge 652 is connected to the end part of the support layer 656 of the mirror 651 and to the end part of the support layer 656 of a mirror adjacent to the present mirror 651. And the elastic hinge 652 comprises a groove in line with the gap between the adjacent mirrors 651. The elastic hinge 652 is connected to the hinge electrode 655, which is shared between the mirror 651 and the adjacent mirror 651 within a substrate 654. And the address electrodes 653a and 653b are placed on the substrate 654 under the mirror 651. The address electrodes 653a and 653b are configured and applied with a voltage Va by a control circuit (not shown in a drawing herein).

The bottom left drawing of FIG. 6 is a side view diagram of the cross-section of the line B-B' of the plain view diagram of the mirror element shown on the top left side of FIG. 6.

An application of a voltage Va to the address electrode 653a makes the mirror 651 of the mirror element 650 deflect to the left side drawn by a coulomb force generated between the address electrode 653a and mirror 651. And the mirror 651 contacts with the address electrode 653a, on the left, which is layered with an insulation film, thereby the deflection of the mirror 651 being held at a constant angle. An illumination of the incident light in the state of holding the deflection angle of the mirror makes the illumination light reflected to a constant direction.

As such, each of the mirror elements of the mirror device according to the embodiment 1 is configured. Here, it is preferable to configure the elastic hinge 652 of each mirror element 650 to have a length of 2 µm or smaller and the mirror 651 to be an approximate square of one side being 10 µm or smaller. Note that the configuration is in a manner to form the individual address electrodes 653a and 653b protruded from the surface of the substrate 654 so that the mirror 651 contacts with the corner of the individual address electrode 653a or 653b to make it play the role of the stopper for the mirror 651, thereby holding the deflection angle of the mirror 651 constant.

The present embodiment is configured to equip the elastic hinge 652 on the end part of the mirror 651, thereby making it possible to spread the address electrodes 653a and 653b in the center area under the mirror 651 and enlarge the area size of the address electrodes 653a and 653b. Such a configuration makes it possible to increase a coulomb force working between the mirror 651 and address electrode 653a or 653b. A larger coulomb force enables reinforcement (e.g., a larger thickness of the elastic hinge) of the structure of the elastic hinge 652 so as to support the mirror 651 more stably. Furthermore, a larger coulomb force enables a quicker control of deflecting the mirror 651 and an improvement of the gradation of an image as compared to the conventional technique.

Embodiment 2

Figure 7A:
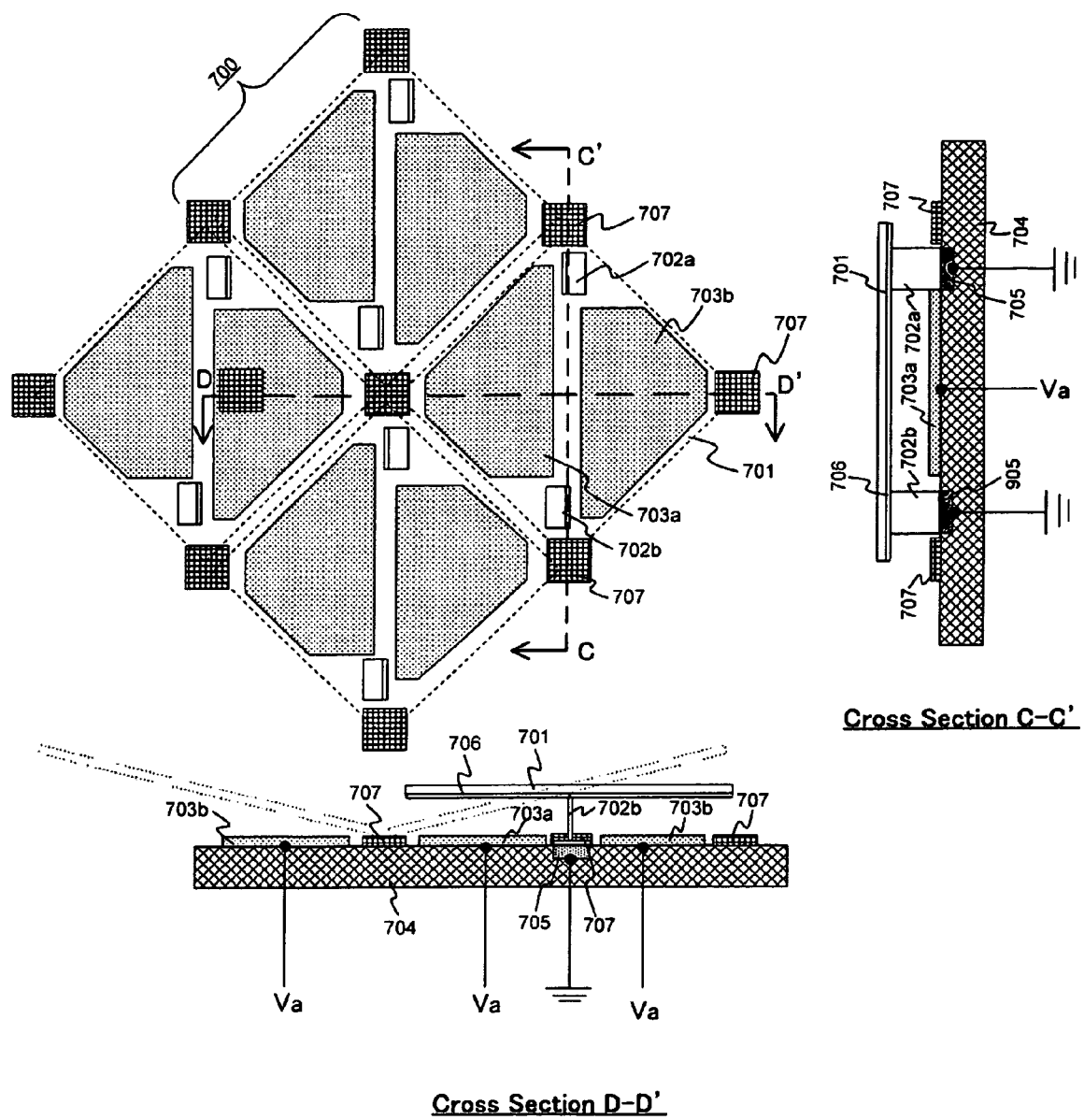
FIG. 7A is a plain view, and a cross-sectional diagram, of a mirror element of a mirror device according to a preferred embodiment 2.

FIG. 7A is a plain view diagram, and a cross-sectional diagram, of a mirror element of a mirror device according to a preferred embodiment 2.

The top left drawing of FIG. 7A is a top plain view of four mirror elements of a mirror device according to the embodiment 2.

Provided here is a description on a configuration of each mirror element 700. Also in each mirror element 700 shown in FIG. 7A, a mirror 701 is deflected on the basis of the deflection axis by a coulomb force generated by an application of a voltage to address electrode 703a or 703b. As a result, the reflecting direction of the light illuminated on the mirror 701 can be changed. FIG. 7A also shows the mirror 701 of each mirror element 700 delineated by the dotted lines. Provided in a part or the entirety under each of the mirrors 701 is a layer called as support layer 706 which is connected to two elastic hinges 702a and 702b equipped on both end parts of one mirror. The support layer 706 may alternatively be formed only on the joining parts with the elastic hinges 702a and 702b. The support layer 706 may alternatively be formed integrally with the elastic hinges 702a and 702b. Furthermore, a joinder member made from titanium (Ti), tungsten (W), tantrum (Ta) or such may be equipped between the support layer 706 and elastic hinges 702a and 702b. The material for the mirror 701 is preferably to use aluminum (Al) with high reflectance.

These elastic hinges 702a and 702b are equipped nearby the deflection axis of the mirror 701. The configuration of FIG. 7A places the elastic hinge 702a, which is equipped on the upper end part of the mirror 701, on the right side of the deflection axis of the mirror 701, while places the elastic hinge 702b, which is equipped on the lower end part of the 701, on the left side of the deflection axis for equalizing the area size of the address electrodes 703a and 703b positioned on the left and right sides of the mirror 701. These elastic hinges 702a and 702b are preferably to be placed so as to maximize and equalize the area sizes of the address electrodes 703a and 703b on the left and right sides of the mirror 701. If one mirror is equipped with two elastic hinges as described above, the thickness of the elastic hinge may be reduced to half as compared to the conventional case of supporting a mirror with one elastic hinge.

The equipment of the elastic hinges 702a and 702b separately in two places under the end parts of the mirror 701 as described above makes it possible to support the mirror 701 stably against a rotation of the mirror surface in the horizontal direction. And the connection of the two elastic hinges 702a and 702b to the same support layer 706 supports the mirror 701 stably, withstanding an external vibration and leading to an improvement of the durability of the mirror device.

And hinge electrodes 705 respectively corresponding to the two elastic hinges 702a and 702b, which are equipped at both of the end parts of the mirror 701, are equipped as hinge structural bodies for supporting the respective elastic hinges 702a and 702b. The individual hinge electrodes 705 are grounded. Note that the hinge structural bodies may alternatively be equipped separately from the hinge electrodes 705.

The address electrodes 703a and 703b are placed under the mirror 701. An application of a voltage to the address electrode 703a or 703b generates a coulomb force working between the mirror 701 and address electrode 703a or 703b, making it possible to deflect the mirror 701. The elastic hinge has conventionally been formed nearby the center part of a mirror, limiting the form, placement and such, of address electrodes positioned under the mirror. Whereas the present embodiment 2 is also configured to equip the elastic hinges 702a and 702b at both of the end parts of one mirror 701, thereby allowing a free usage of the vicinity of the center part under the mirror 701. This accordingly makes it possible to place the address electrodes 703a and 703b and such, freely in the vicinity of the center part under the mirror 701. Also enabled is an increase of the area size of the address electrodes 703a and 703b by using the vicinity of the center part under the mirror 701 and, therefore, an increase of the coulomb force for deflecting the mirror 701. As a result, a voltage to be applied to the address electrodes 703a and 703b for deflecting the mirror 701 can be decreased. And the capability of decreasing the voltage to be applied to the address electrodes 703a and 703b makes it possible to make the mirror 701 more compact, as described for the embodiment 1.

Note that the configuration of FIG. 7A has the form of the address electrodes 703a and 703b positioned on the left and right sides of the deflection axis of the mirror 701 thereunder featured as one edge of the approximate triangle being cut off substantially, and equalizes the area size of the address electrodes 703a and 703b by placing them symmetrically about a point of the center of the mirror 701.

Stoppers 707 are placed and shared by the apexes of the mutually adjacent individual mirrors 701. When the mirror 701 is deflected by a coulomb force as a result of a voltage being applied to the address electrodes 703a and 703b, the mirror 701 contacts with a stopper 707 makes the deflection angle of the mirror 701 constant, thus determining the reflection of the light at a prescribed direction. An appropriate adjustment of the height or such of the stopper 707 makes it possible to determine the deflection angle of the mirror 701. A sharing of the stopper 707 with the respective mirrors 701 makes it possible to not only reduce the number thereof as compared to a conventional configuration but also control so as to reflect the illumination light at practically the same deflection angle as that of the adjacent mirrors 701. Note that the form, thickness, height and such of the individual constituent component of each of the mirror 701, support layer 706, elastic hinges 702a and 702b, stopper 707 and address electrodes 703a and 703b may be appropriately modified.

And the individual structure, in place of integrating a stopper with the address electrodes 703a and 703b, enables a prevention of stiction, which can otherwise occur at the time of the mirror contacts with the address electrode 703a or 703b.

The top left drawing of FIG. 7A is a view, from the right side, of the cross-section on the line C-C' indicated in the plain view diagram of the mirror element shown on the top left side of FIG. 7A. The mirror 701 is supported by the support layer 706, on both ends part of which is connected to the two elastic hinges 702a and 702b. The elastic hinges 702a and 702b are connected to the respective hinge electrodes 705 corresponding to the individual elastic hinges 702a and 702b within the substrate 704. The address electrodes 703a and 703b are placed on the substrate 704 positioned under the mirror 701, and the address electrode 703a on the left side of the mirror 701 is placed in symmetry about a point of the center of the mirror 701 and against the address electrode 703b on the right side of the mirror 701. And the individual address electrodes 703a and 703b are provided with means for applying the voltage Va from a control circuit (not shown in a drawing herein). The control circuit is preferably to comprise dynamic random access memory (DRAM).

The bottom left drawing of FIG. 7A is a side view of the cross-section on the line D-D' indicated in the plain view diagram of the mirror element shown on the top left side of FIG. 7A.

When a voltage is applied to the address electrode 703a on the left side, the mirror 701 of the mirror element 700 is deflected to the left side by a coulomb force working between the address electrode 703a on the left side and mirror 701. Then, the mirror 701 contacts with the stopper 707 shared with the adjacent mirror 701 maintain the deflection angle constant. An illumination of the incident light in the state of determining the deflection of the mirror 701 reflects the illumination light in a prescribed direction. Such is a configuration of the individual mirror elements 700 of the mirror device according to the present embodiment 2.

Figure 7B:
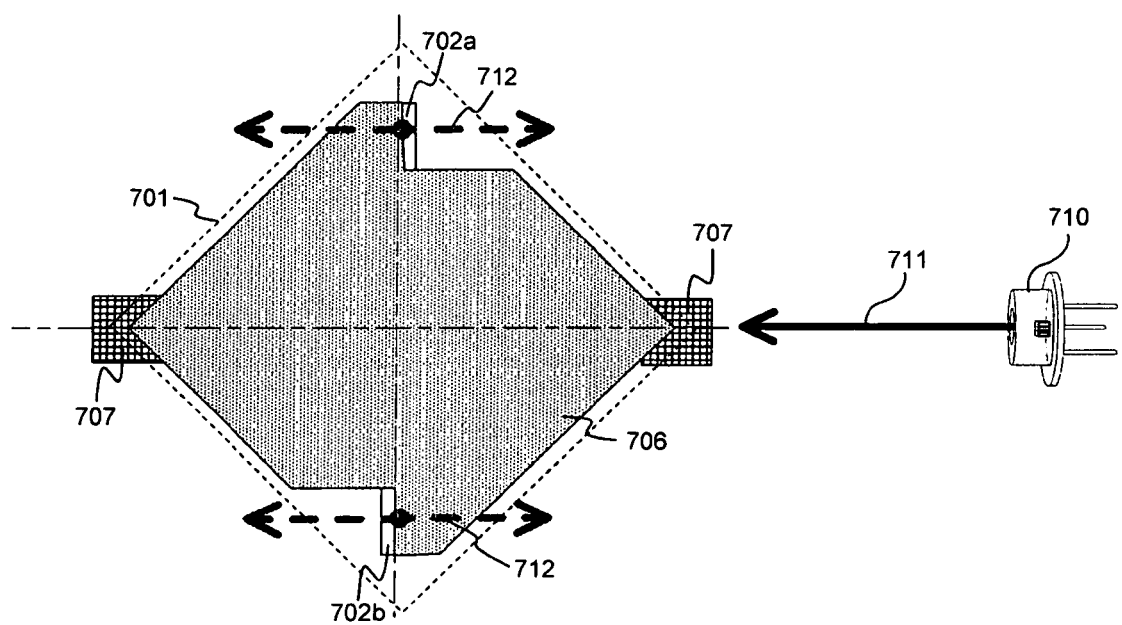
FIG. 7B exemplifies a support layer of a mirror of a mirror element shown on the top left side of FIG. 7A.

The next is a description of an example of a support layer 706 of the mirror element 700 shown on the top left of FIG. 7A by referring to FIG. 7B.

FIG. 7B exemplifies a support layer 706 of the mirror 701 of a mirror element 700 shown on the top left side of FIG. 7A.

The mirror 701 of FIG. 7A is placed on the support layer 706 shown in FIG. 7B. The support layer 706 comprises cutout parts at the respective connection parts with the elastic hinges 702a and 702b. In the production process of the mirror, a sacrifice layer is layered uniformly so as to cover on each support layer 906 and support layer be exposed by polishing the deposited sacrifice layer, followed by layering the mirror 701. Since the thickness of the mirror 701 is merely a level of 1000 to 3000 angstroms, however, a slight step in response to the forms of the surface for layering the mirror 701 is generated. This results in leaving a slight step on the surface of the mirror 701 layered on the support layer 706 in the cutout part. Meanwhile, FIG. 7B illustrates the diffraction light generated at the time of illuminating the mirror 701 with the incident light from the direction orthogonal to the deflection axis of the mirror 701.

The diffraction light 712 is generated in the direction orthogonal to each side of the mirror 701 illuminated with the light, and therefore the diffraction light 712 is generated in the direction of the left and right arrows shown in FIG. 7B from the cutout part of both of the edges of the mirror 701, to which the illumination light is incident, on the mirror placed on the support layer 706 of FIG. 7B. In this case, the diffraction light 912 is generated only at both of the sides, at the cutout part, of the mirror 701 and therefore it is possible to lessen the influence of the diffraction light entering the projection lens as compared to the mirror shown for the conventional technique which has a step in the center part of the mirror, generating the diffraction light at the center part. Incidentally, it is preferable to configure the top surface of the mirror 701 so as not to have a step of the depth or height of the wavelength of the light emitted from the light source in order to avoid an occurrence of a diffraction light 712 as much as possible.

Figure 8:
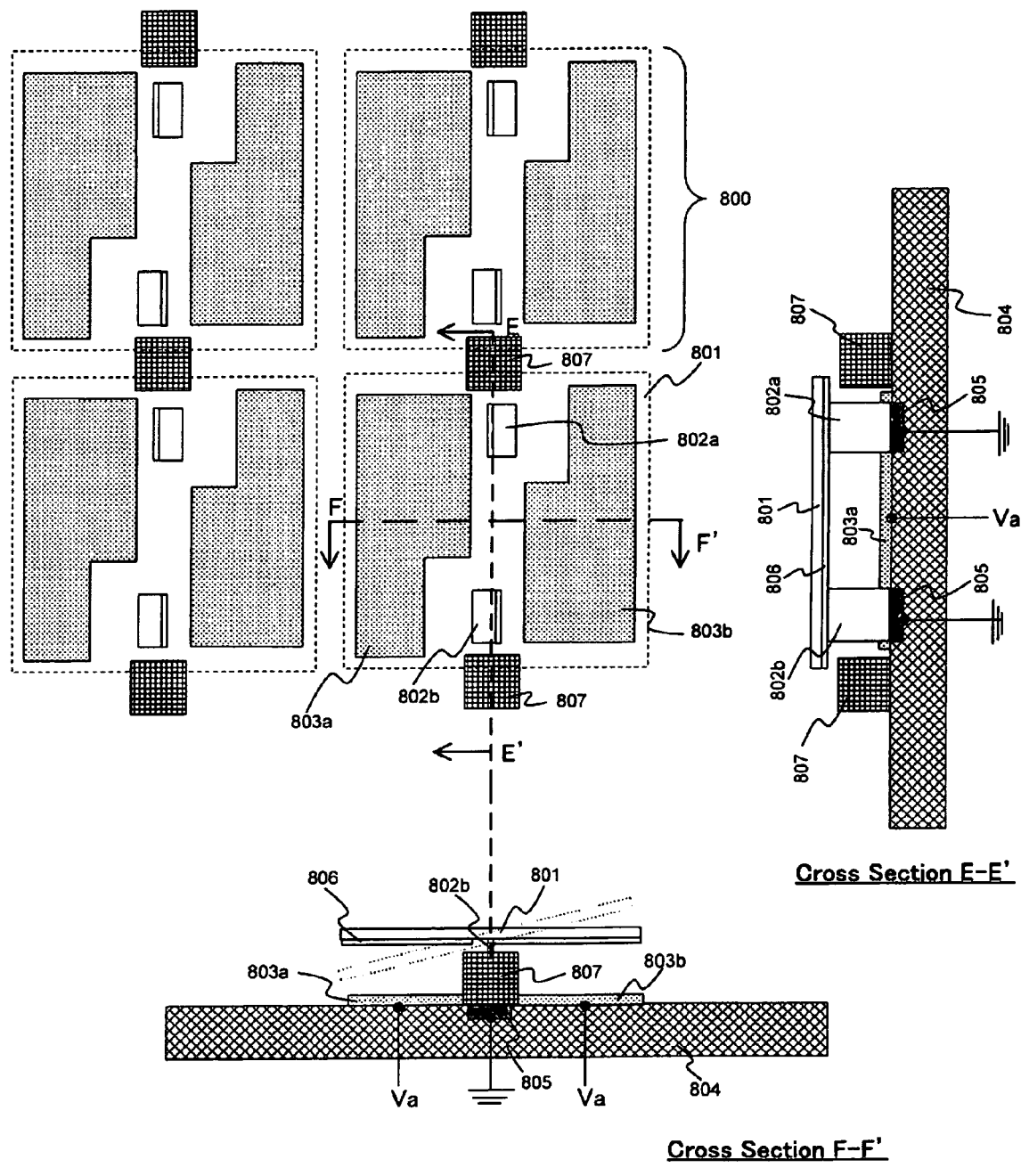
FIG. 8 is a plain view diagram, and a cross-sectional diagram, of a modified example of the mirror element shown in FIG. 7A.

The next exemplifies a modified embodiment of the mirror device of the embodiment 2 by referring to FIG. 8. FIG. 8 is the plain view and cross-sectional diagrams of a modified example of the mirror element 800 shown in FIG. 7A.

The top left drawing of FIG. 8 is the top plain view diagram of a modified example of the four mirror elements shown in FIG. 7A. The mirror element 800 of FIG. 8 comprises a center division line of the mirror 801 as the deflection axis thereof, which is different from the mirror element 700 of FIG. 7A. It also equips elastic hinges 802a and 802b at positions of the respective both end parts of the mirror 801 nearby the deflection axis. The forms of address electrodes 703a and 703b, which are shown in FIG. 7A, are changed so as to even out the area sizes of address electrodes 803a and 803b on the left and right sides of the deflection axis of the mirror 801.

Then, stoppers 807 are placed nearby the deflection axis, and the sides, of each mirror 801 so as to share a stopper 807 between the respective adjacent mirrors 801. And the mirror 801 contacts with the corner of the stopper 807 at the time of the mirror 801 being deflected by a coulomb force makes the deflection angle of the mirror 801 constant, thereby determining the reflection of the illumination light in one direction. An appropriate adjustment of the height or such of the stopper 807 makes it possible to determine the deflection angle of the mirror 807. The sharing of the stopper 807 between the respective adjacent mirrors 801 makes it possible not only to reduce the number of stoppers 807 than that of the conventional technique, but also to enable the reflection of the illumination light at approximately the same as the mutually adjacent mirror 801.

As for the configuration other than the above description, the elastic hinges 802a and 802b, address electrodes 803a and 803b and stoppers 807 are placed symmetrically about a point of the center of the mirror 801 likewise the configuration of FIG. 7A. Note that the elastic hinges 802a and 802b are preferably to be placed so as to maximize and equalize the area sizes of the address electrodes 803a and 803b on the left and right sides of the deflection axis of the mirror 801. The equipment of the elastic hinges 802a and 802b at the end parts of the mirror thusly makes it possible to place the address electrodes 803a and 803b, and such, nearby the center part on the mirror 801 and increase the area size of the address electrodes 803a and 803b nearby the center part. This configuration results in increasing the coulomb force for deflecting the mirror 801.

The top right drawing of FIG. 8 is a side view of the cross-section of the line E-E' of the plain view diagram of the mirror element 800 shown on the top left side of FIG. 8. The mirror 801 is supported by a support layer 806, the both end parts of which are connected to the two elastic hinges 802a and 802b. The individual elastic hinges 802a and 802b are connected to the respective hinge electrodes 805 corresponding to the respective elastic hinges 802a and 802b within a substrate 804. The individual address electrodes 803a and 803b are placed on the substrate 804 positioned under the mirror 801, with the address electrode 803a on the left side of the mirror 801 being placed symmetrically about a point of the center of the mirror 801 with respect to the address electrode 803b on the right side of the mirror 801. And the individual address electrodes 803a and 803b are provided with means for applying a voltage Va from a control circuit (not shown in a drawing herein). The control circuit, comprising a capacitor, is connected to the address electrodes 803a and 803b, respectively. And the control circuit preferably comprises dynamic random access memory (DRAM). Also configured is that the stopper 807 is placed nearby the elastic hinges 802a and 802b so as to make the mirror 801 contacts with on a corner of the stopper 807 when the mirror 801 is deflected. The bottom left drawing of FIG. 8 is a side view of the cross-section of the line F-F' of the plain view diagram of the mirror element 800 shown on the top left of FIG. 8.

When a voltage is applied to the address electrode 803a on the left side (with a voltage not being applied to the other address electrode 803b), the mirror 801 of the mirror element 800 is deflected to the left side by a coulomb force working between the address electrode 803b on the left and mirror 801. And the mirror 801 contacts with on the corner of the stopper 807 which is shared with the adjacent mirror 801 maintains the deflection angle of the mirror 801 constant. An illumination of the incident light in the state of maintaining the deflection angle of the mirror 801 reflects the illumination light in a prescribed direction reflected by the mirror 801.

Such is the configuration of the individual mirror elements 800 of FIG. 8. Note that it is preferable to configure the elastic hinge of each mirror element 800 to have the length of 2 μm or smaller and the mirror 801 of each mirror element to be an approximate square with the side of 10 μm or smaller.

Embodiment 3

Figure 9A:
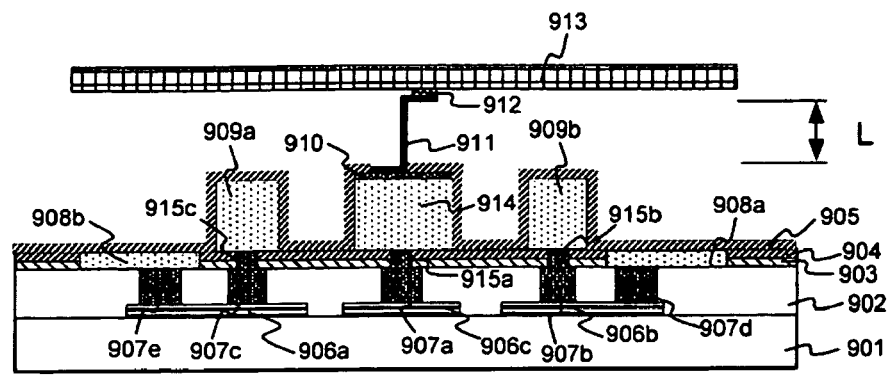
FIG. 9A is a cross-sectional diagram of a mirror element of a mirror device according to a preferred embodiment 3.

FIG. 9A is a cross-sectional diagram of a mirror element of a mirror device according to a preferred embodiment 3.

The mirror element shown in FIG. 9A comprises a semiconductor wafer substrate on which formed are the wirings 906a, 906b and 906c of a drive circuit for driving and controlling a mirror 913, the first Vias 907a, 907b, 907c, 907d and 907e which are connected to the wiring 906a, 906b and 906c of the drive circuit, a first insulation layer 901 and a second insulation layer 902. Here, the wiring 906a on the left is equipped with two first Vias 907c and 907e across the insulation layer 902, and the wiring 906b on the right is likewise equipped with two first Vias 907b and 907e across the insulation layer 902. The wiring 906c in the center is equipped with only one Via 907a. As such, the present embodiment is configured to equip three of wirings 906a, 906b and 906c and five of the first Vias 907a, 907b, 907c, 907d and 907e in the insulation layer 902.

Note that the present embodiment is configured to equip the left and right wirings respectively with two of the first Vias, the numbers of the first Vias, however, may be different between the left and right wirings. Also, the number of the first Vias may be larger or smaller than that specified for the present embodiment. And second Vias 915a, 915b and 915c and surface electrodes 908a and 908b are formed on the first Vias 907a, 907b, 907c, 907d and 907e, respectively, on the left and right.

The second Vias 915a, 915b and 915c are formed on the first Via 907a, which is formed on the wiring 906c at the center, and the first Vias 907b and 907c, which are formed on the wirings 906a and 906b on the left and right. Surface electrodes 908a and 908b are formed respectively on the remaining first Vias 907d and 907e, on which second Via 915a, 915b or 915c was not formed on the wirings 906a and 906b.

Then, a first protective layer 903 is accumulated on the insulation layer 902 and a second protective layer 904 is formed on the first protective layer 903.

The semiconductor wafer substrate is preferably a silicon substrate.

The wirings 906a, 906b and 906c are preferably aluminum wirings.

The Vias 907a, 907b, 907c, 907d and 907e, and second Vias 915a, 915b and 915c, are preferably constituted by a metal including tungsten or cupper.

The surface electrodes 908a and 908b may use a material (e.g., tungsten or aluminum) be similar to that of the first Vias 907a, 907b, 907c, 907d and 907e and second Vias 915a, 915b and 915c, or a material with high electrical conductivity such as aluminum. The form of the surface electrodes 908a and 908b may be arbitrary. While the configuration of FIG. 9A forms the surface electrodes 908a and 908b on the first Vias 907d and 907e, they may be formed directly on the wirings 906a and 906b.

The first protective layer 903 and second protective layer 904 are preferably layers including silicon such as silicon carbide (SiC), amorphous silicon. If aluminum is used for the surface electrodes 908a and 908b, a direct contact between the amorphous silicon and aluminum surface electrode 908a and 908b eats away at the aluminum surface electrodes 908a and 908b and therefore a provision of silicon carbide (SiC) layer between the amorphous silicon and aluminum surface electrodes 908a and 908b is preferable. Alternatively, an electrode may be formed by mixing aluminum with an impurity such as silicon, or a barrier layer may be provided by using a material other than a SiC layer. Such a barrier layer may comprise two or more layers.

As an example, the first insulation layer 901 and second insulation layer 902 of FIG. 9A is one layer made from silicon dioxide (SiO2). Meanwhile, the mirror element according to the embodiment 3 is configured to equip the electrodes 909a, 909b and 914 so as to secure an electrical connection to the second Vias 915a, 915b and 915c. The electrodes 909a, 909b and 914 may preferably use a high electric conductivity material such as aluminum.

The electrode 914 at the center shown in FIG. 9A (constituting a hinge electrode later) is an electrode equipped for an elastic hinge 911 and is configured to be the same height as that of the electrodes 909a and 909b on the left and right. The forming of the individual electrodes 909a, 909b and 914 to be the same height between the center and the left and right makes it possible to form the three electrodes 909a, 909b and 914 in the same one process. And a barrier layer 910 made from tantrum, titanium and such is formed on the electrode 914 at the center. The barrier layer 910 may be structured by two or more layers. Such the barrier layer may comprise on the three electrodes 909a, 909b and 914. And an appropriate modification of the height of the electrode 914 at the center makes it possible to determine a setup of a height at the center for placing an elastic hinge 911 described later. A setup of the height of the elastic hinge 911 may be determined by adjusting the height of the barrier layer 910.

Then, the elastic hinge 911 is formed on the electrode 914 at the center, on which the barrier layer 910 is formed, so as to be connected to the barrier layer 910.

The elastic hinge 911 is made from amorphous silicon or silicon germanium (SiGe), for example. The thickness of the elastic hinge 911 (in the left and right direction of the drawing of FIG. 9A) is preferably approximately 150 to 500 angstroms.

Here, a plurality of elastic hinges may be provided for one mirror and the mirror may be supported by individually smaller width elastic hinges. As an example, two of an elastic hinge narrower than the conventional configuration may be placed for one mirror at both end parts thereof.

Meanwhile, the elastic hinge 911 preferably possesses an electric conductivity by applying an In-Situ doping (such as arsenic and phosphorus), an ion implanting, a diffusion of metallic silicide such as nickel silicide (NiSi), titanium silicide (TiSi) or such. Furthermore, the mirror element according to the embodiment 3 is configured to accumulate a third protective layer 905 on the surface of the structure part of the semiconductor wafer substrate on which the electrodes 909a, 909b and 914 are formed. A third protective layer 905 is preferably a layer including silicon such as silicon carbide (SiC), amorphous silicon.

Meanwhile, the upper surface of the elastic hinge 911 may be provided with a joinder portion, which can be configured to be the same form and area size as the mirror 913 as described later. The embodiment 3 is configured to make the joinder portion as the smallest area size as possible. Such a configuration makes it possible to prevent the mirror 913 from being deformed or warped by the difference of linear expansion coefficients between the mirror 913 and joinder portion. And a metallic layer 912 is accumulated on the joinder portion of the elastic hinge 911 for securing electric conductivity between the elastic hinge 911 and mirror 913 while eliminating a variation of the heights among individual mirror elements.

As an example, the metallic layer 912 is a material including tungsten or titanium; a material including another metal may be accumulated instead.

If the mirror 913 is made from aluminum and the elastic hinge 911 is configured by using a silicon material, then a barrier layer (not shown in a drawing herein) may further be layered on the metallic layer 912 in order to prevent the mirror 913 from contacting with the joinder portion. Such a barrier layer may be constituted by two or more layers.

The barrier layer is made from a material including tantrum, titanium, et cetera. And the mirror element according to the embodiment 3 is structured by forming the mirror 913 on the metallic layer 912 of the elastic hinge 911.

The mirror 913 is desirably to be made from a material with high reflectivity of light, such as aluminum. And the mirror 913 is approximately square, with one side thereof being preferably between 4 and 10 μm. The gap between individual mirrors 913 may preferably be 0.15 to 0.55 μm. And the aperture ratio of individual mirror element is desirably to be designed about 90%.

Such is the configuration of the mirror element according to the embodiment 3 shown in FIG. 9A.

Figure 9B:
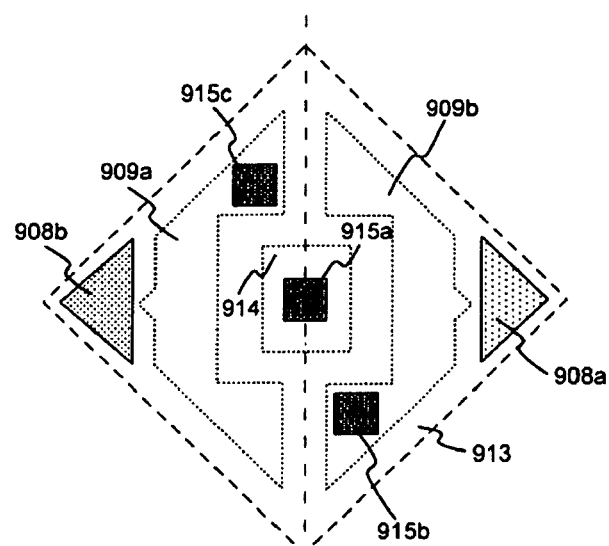
FIG. 9B is a plain view diagram of a surface of a semiconductor wafer substrate of a mirror device according to the embodiment 3.

FIG. 9B is a plain view diagram of a surface part of a semiconductor wafer substrate of the mirror device according to the embodiment 3.

Note that the electrodes 909a and 909b on the left and right and the electrode 914 at the center, which are formed on the mirror 913 and the second Vias 915a, 915b and 915c, are delineated by the dotted lines. And the deflection axis of the mirror 913 is indicated by the chain lines.

As shown in FIG. 9B, the second Vias 915a, 915b and 915c for securing an electric conduction with the electrodes 909a, 909b and 914 are placed under the electrodes 909a, 909b and 914. And the surface electrodes 908a and 908b formed in a manner to increase a coulomb force for deflecting the mirror 913 are formed thereunder.

Figure 9C:
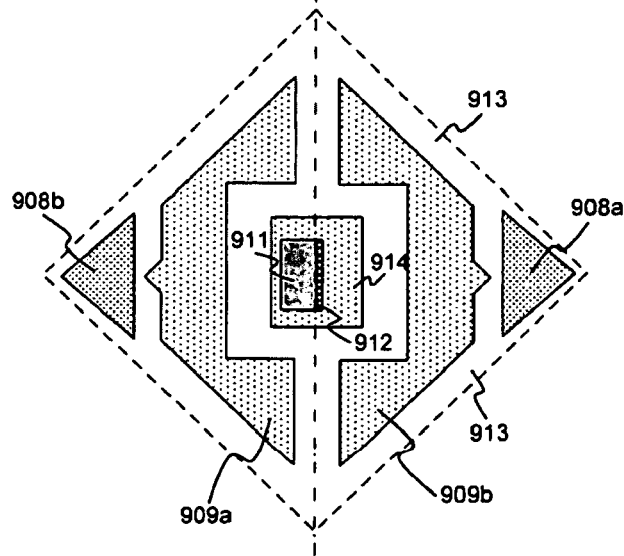
FIG. 9C is a plain view diagram of a mirror element of a mirror device of the embodiment 3 with a mirror being removed.

FIG. 9C is a plain view diagram when the mirror 913 of the mirror device of the embodiment 3 is removed, where the mirror 913 is indicated by the dotted lines. As shown in FIG. 9C, the respective apexes of the electrodes 909a and 909b at both end parts of the mirror 913 are formed as protrusion. And the design is such that the deflection angle of the mirror 913 is at a prescribed angle when contacts with the protrusion of the electrodes 909a and 909b when the mirror 913 is deflected.

Figure 9D:
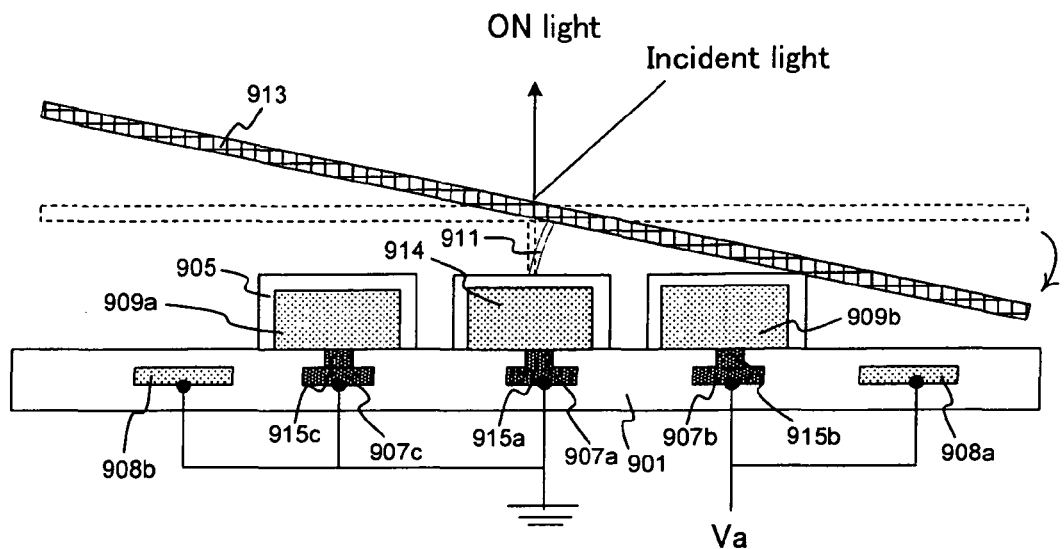
FIG. 9D is a cross-sectional diagram when a mirror of the mirror element shown in FIG. 9A is deflected to an ON state.

The tips of the electrodes 909a and 909b are desirably to be designed so as to make the deflection angle of the mirror 913 between 8 and 14 degrees. Such deflection angle of the mirror 913 is desirably to be designed in compliance to the design of the light source and optical system of a projection apparatus. And the length of the elastic hinge 911 of each mirror element is preferably configured to be 2 μm or shorter, and the mirror 913 is preferably configured to be an approximate square with the length of one side being 10 μm or smaller. FIG. 9D is a cross-sectional diagram when the mirror element shown in FIG. 9A is deflected to an ON state.

The embodiment 3 is assumed to be configured to reflect the light emitted from a light source as the ON light when the mirror 913 shown in FIG. 9A is deflected to the right side, while reflect the light emitted from the light source as the OFF light when the mirror 913 is deflected to the left side.

When a voltage is not applied to the individual electrode 908a or 908b on the left and right, or the individual electrode 909a or 909b, the elastic hinge 911 is not deformed and the mirror 913 is maintained in the horizontal direction.

Here, an application of a voltage to the right side electrode 909b and right side surface electrode 908a generates a coulomb force determined by:

[top surface area size of electrode]*[voltage applied to electrode]*[the second power of the distance between aluminum and mirror], Between the right side electrode 909b and mirror 913 and between the right side surface electrode 908a and mirror 913.

And the mirror 913 is deflected by the total coulomb force generated between the right side electrode 909b and mirror 913 and between the right side surface electrode 908a and mirror 913.

In this event, the distance between the mirror 913 and right side surface electrode 908a is longer than that between the mirror 913 and right side electrode 909b, and the area size of the right side surface electrode 908a is smaller than that of the right side electrode 909b, and therefore the generated coulomb force is also smaller than that generated between the right side electrode 909b and mirror 913. And in the state of the mirror 913 being drawn to the right side surface electrode 908a as a result of the mirror being deflected, the mirror 913 is deflected to 12 to 14 degrees and the reactive force of the elastic hinge due to the resilience is now strong. The coulomb force works in a manner to draw the tip part of the mirror 913 to the right side surface electrode 908a placed on the substrate surface, however, so that the mirror 913 can be drawn by a smaller coulomb force because of the principle of the lever (that is, the principle of the moment of a rigid body. As a result, the right side surface electrode 908a is capable of retaining the deflection of the mirror 913 in the state of a low voltage being applied thereto.

When the mirror 913 is deflected to the right side, the surface electrode 908b on the other side (that is, the left side) and the left side electrode 909a are put in the same potential and grounded by connecting to the GND.

Meanwhile, an equipment of the surface of the semiconductor wafer substrate with the electrodes 909a and 909b and hinge electrode 914 makes the substrate surface possess the not flat surfaces. The light projected from the light source passes through the mirror gap reaches the electrode and reflected again from the mirror to reduce an undesirable reflect light.

Figure 9E:
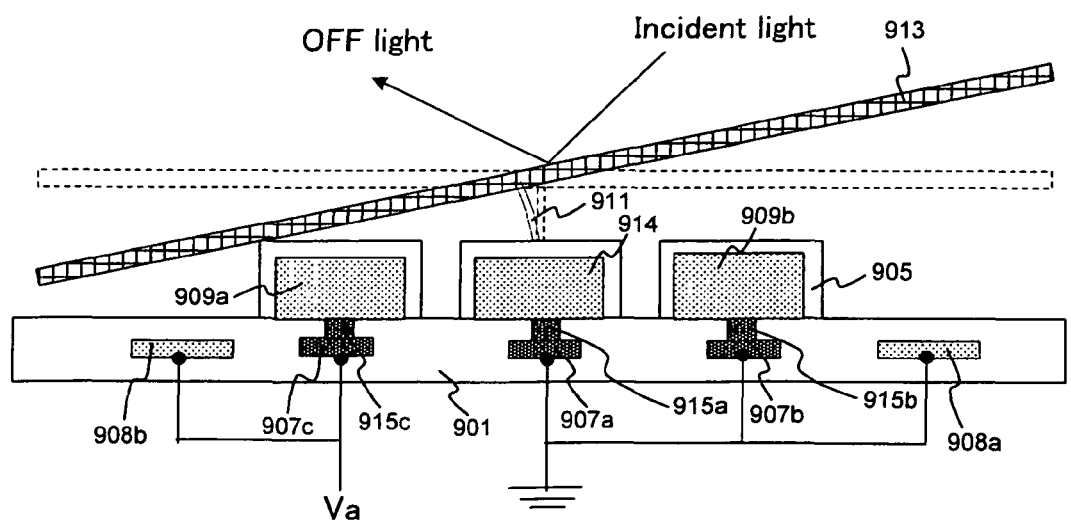
FIG. 9E is a cross-sectional diagram when a mirror of the mirror element shown in FIG. 9A is deflected to an OFF state.

FIG. 9E is a cross-sectional diagram when the mirror element shown in FIG. 9A is deflected to an OFF state. In FIG. 9E, an application of a voltage to the left side surface electrode 909a and left side electrode 908b makes it possible to deflect the mirror 913 to the left side likewise the content noted for FIG. 9D.

The principle and the action of the Coulomb force in this case is similar to that noted for FIG. 9D and therefore the description is omitted here.

Incidentally, in the case of changing the forms of the mirror 913 and elastic hinge 911 on the right and left sides of the mirror element, that of differentiating the resilience of the elastic hinge 911 on the right and left sides of the mirror element and that of changing the deflection control for the mirror 913 on the right and left sides of the mirror element, the area size, height and placement (i.e., layout) of the respective surface electrodes 908a and 908b, or the respective electrodes 909a, 909b and 914, on the right and left sides of the mirror element may be changed so as to apply an appropriate voltage, thereby controlling the deflection of the mirror 913.

Furthermore, a control can be performed in a manner to apply voltages in multiple steps to the respective surface electrodes 908a and 908b and respective electrodes 909a and 909b on the right and left sides of the mirror element.

Furthermore, the circuit and voltage for driving either one of the surface electrodes 908a and 908b and electrodes 909a and 909b of the surface electrodes 908a and electrode 909b on the right side of the mirror element or the surface electrode 908b and electrode 909a on the left side may be appropriately changed.

Furthermore, both or either one of the surface electrodes 908a and 908b and electrodes 909a and 909b of the surface electrodes 908a and electrode 909b on the right side of the mirror element or the surface electrode 908b and electrode 909a on the left side may be protruded from the substrate.

Furthermore, both or either one of the surface electrodes 908a and 908b and electrodes 909a and 909b of the surface electrodes 908a and electrode 909b on the right side of the mirror element or the surface electrode 908b and electrode 909a on the left side may be placed on the surface of the substrate.

As such, the mirror 913 of the mirror element according to the embodiment 3 is deflected, thereby making it possible to change the reflecting direction of the illumination light appropriately.

The next is a description on a production method for the mirror device of the above described embodiments 1, 2 and 3 by referring to FIGS. 10A through 13B. That is the production method for the mirror device described below is that for the mirror element possessing the characteristic of the elastic hinge or electrode described above.

<Mirror Device Production Method 1>

FIG. 10A through 13B note the production method for the mirror device according to the present embodiments primarily shown in FIGS. 7A and 7B; a mirror device of another embodiment can also be produced by modifying the similar process a little.

Figure 10A:
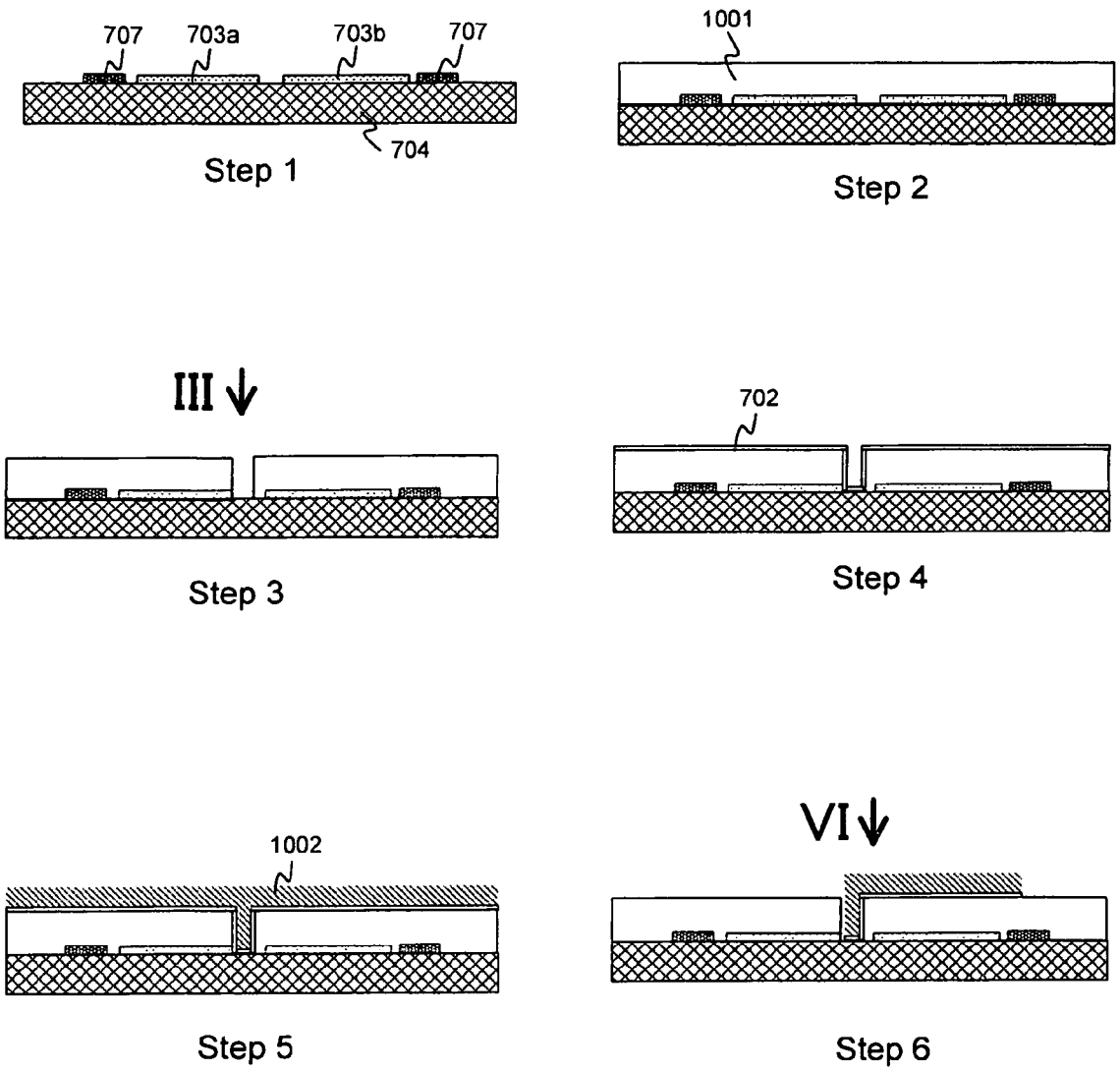
FIG. 10A is a cross-sectional diagram of one mirror element of a mirror device for describing a production process of the mirror device.
Figure 10B:
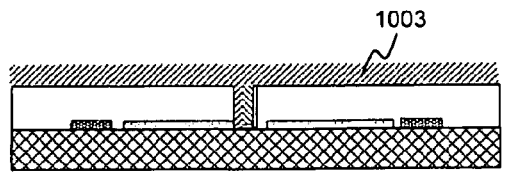
FIG. 10B is a cross-sectional diagram of one mirror element of a mirror device for describing a production process of the mirror device.
Figure 10B:
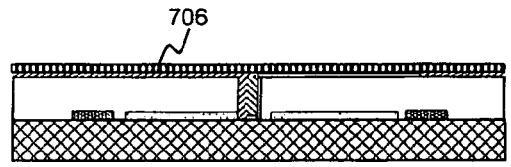
Figure 10B:
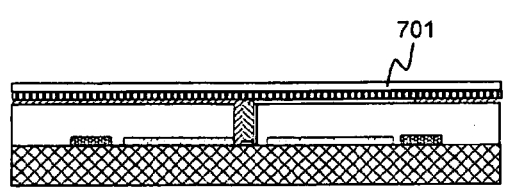
Figure 10B:
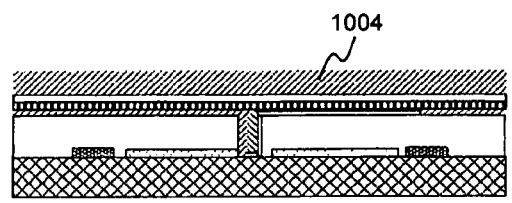
Figure 10B:
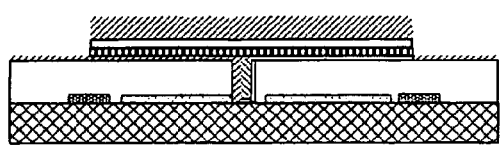
Figure 10B:
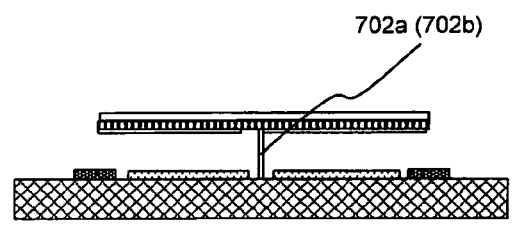

FIGS. 10A and 10B are cross-sectional diagrams of one mirror element of a mirror device for describing a production process of the mirror device.

The step 1 of FIG. 10A forms, on the semiconductor wafer substrate 704, a drive circuit (not shown in a drawing herein) for driving and controlling a mirror placed later, the address electrodes 703a and 703b which are connected to the drive circuit and the stopper 707 for determining the deflection angle of the mirror 701 as the stopper 707 contacts the mirror and prevents the mirror from moving beyond a predefined angle. Then the process proceeds with a step of confirming the operation of the drive circuit and a presence or absence of the electrical connection of the address electrodes 703a and 703b. If there is no abnormality in the drive circuit or address electrodes 703a and 703b, the process proceeds to a step 2.

The step 2 of FIG. 10A accumulates the first sacrifice layer 1001 of a height approximately desired as the elastic hinges 702a and 702b on the semiconductor wafer substrate 704 on which the drive circuit (not shown in a drawing herein), address electrodes 703a and 703b and stopper 707 have been formed. The first sacrifice layer 1001 is used for forming the mirror surface to be formed in a later step by maintaining a gap against the semiconductor wafer substrate 704. In the present embodiment, the height of the first sacrifice layer 1001 results in determines the height of the elastic hinges 702a and 702b, described later, supporting the mirror 701.

The first sacrifice layer 1001 according to the present embodiment is accumulated on the semiconductor wafer substrate 704, address electrodes 703a and 703b and stopper 707 by using the method called a chemical vapor deposition (CVD). The chemical vapor deposition is a method for placing a semiconductor wafer in a reaction chamber, supplying a material in accordance with the kind of sacrifice layer in a gas state and accumulating a film by utilizing a chemical catalytic reaction. Plasma Enhanced CVD (PECVD) is more preferable. The sacrifice layer 1001 preferably uses a material such as tetraethoxysilane (TEOS).

The step 3 of FIG. 10A removes the first sacrifice layer 1001 by applying the etching and equipping an opening part for determining the height and form of the elastic hinges 702a and 702b to be formed in a later process. The opening part is preferably as small as possible for widening the spots for placing the address electrodes 703a and 703b. The present embodiment is configured to equip the opening part nearby the deflection axis on the end part of the mirror 701.

Figure 11A:
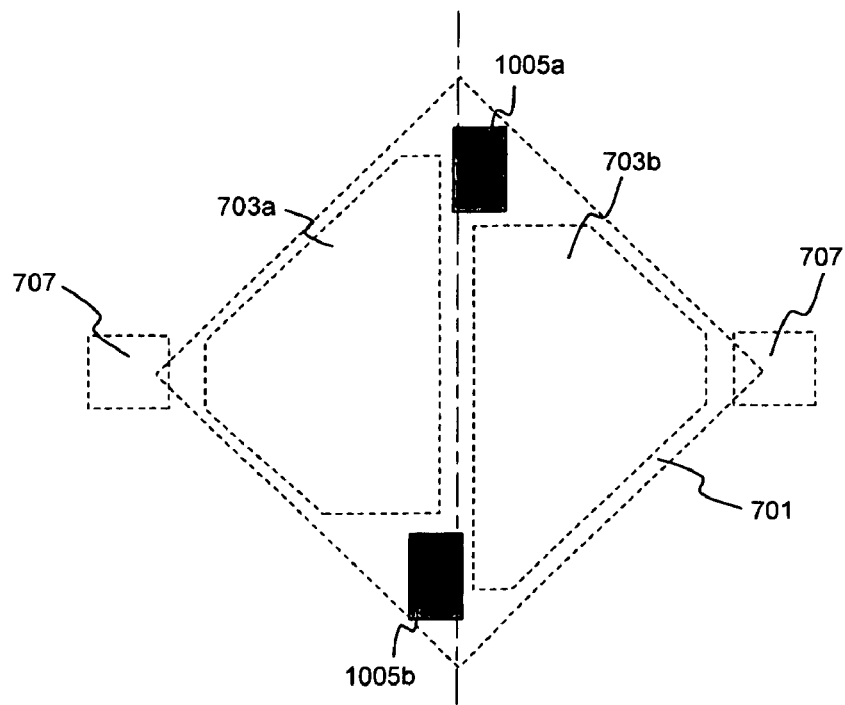
FIG. 11A is a plain view diagram of a mirror element viewing from the arrow direction III in the step 3 of FIG. 10A.

FIG. 11A is a plain view diagram of the mirror element viewing from the arrow direction III of FIG. 10A in the step 3. FIG. 11A shows a part of the mirror element covered with the first sacrifice layer 1001 and the mirror 701 to be formed later by the dotted lines. An opening part is formed nearby the deflection axis on the end part of the mirror 701 for generating the elastic hinges 702a and 702b. FIG. 11A shows the forming of the opening part 1005a to the right of the deflection axis in the upper end part of the mirror 701, and of the opening part 1005b to the left of the deflection axis in the lower end part of the mirror 701. This configuration is for placing the address electrodes 703a and 703b symmetrically about a point of the center of the mirror 701, thereby equalizing the area sizes of the address electrodes 703a and 703b on the left and right sides of the deflection axis as noted for FIG. 7A. And the width (i.e., the up and down direction, of the drawing, of the opening part) of the opening parts 1005a and 1005b is preferably to be so formed as to be equivalent to the width of a desired width of the elastic hinges 702a and 702b. If two of the elastic hinges 702a and 702b are formed as shown in FIG. 7A, the width of the respective elastic hinges 702a and 702b may be reduced to half of the width of the elastic hinge at the time of supporting one mirror with one elastic hinge. Meanwhile, the individual opening parts may be formed for forming an elastic hinge by using the opening part on the upper end part of the mirror and the opening part on the lower end part of the adjacent mirror so as to share one elastic hinge by mutually adjacent mirrors likewise the elastic hinge as noted in FIG. 6.

The step 4 of FIG. 10A accumulates the joinder portion 702 on the first sacrifice layer 1001 and opening parts 1005a and 1005b. FIG. 10A shows the elastic hinges 702a and 702b and the joinder portion 702 as one body. Preferable materials may include amorphous silicon, poly-silicon or such for example. In the present embodiment, the joinder portion 702, the elastic hinges 702a and 702b for supporting the mirror 701 are formed by a later application of an etching. The thickness of the joinder portion 702 covering the opening parts 1005a and 1005b eventually determines the thickness of the elastic hinges 702a and 702b.

The step 6 of FIG. 10A accumulates a first mask layer 1002 on the joinder portion 702. The first mask layer 1002 is a photoresist for example.

The step 6 of FIG. 10A applies a patterning to the first mask layer 1002. The first mask layer 1002 by using a mask for obtains the desired structural body feature of the joinder portion 702, the elastic hinges 702a and 702b. In specific, the etching is employed to remove the joinder portion 702 by leaving a part of the elastic hinges 702a and 702b on which the first mask layer 1002 has been accumulated and the first mask layer 1002 as shown in the present step for example. In the case of the present embodiment, the joinder portion 702, the elastic hinges 702a and 702b are integrated together. The drawing of the present step shows how a space is created in a part of the opening parts 1005a and 1005b as a result of etching the part of the opening parts 1005a and 1005b in order to obtain a desired structural body feature.

Figure 11B:
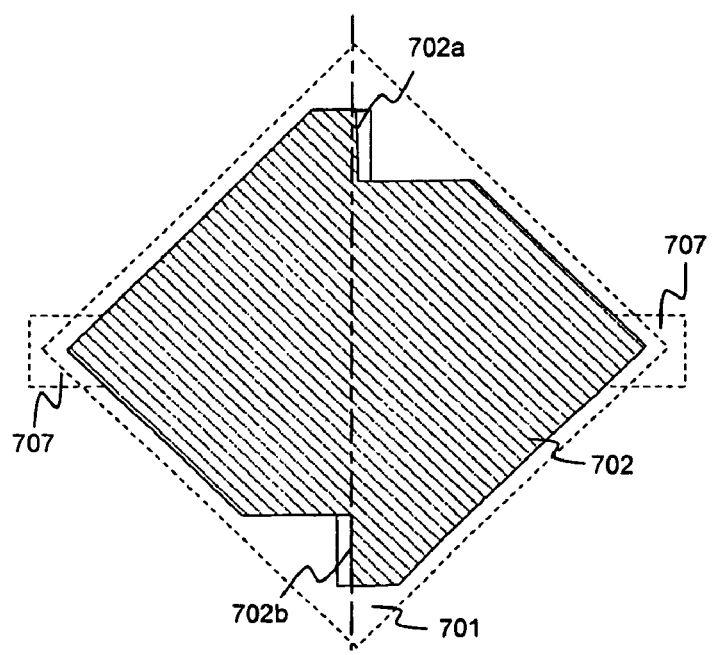
FIG. 11B is a plain view diagram of a mirror element viewing from the arrow direction IV in the step 6 of FIG. 10A.

FIG. 11B is a plain view diagram of the mirror element viewing from the arrow direction IV of FIG. 10A in the step 6. (The first mask layer 1002 is not shown in a drawing herein)

FIG. 11B shows a part of the mirror element and the dotted lines shows the locations provided for mirror 701 to be formed later. FIG. 11B also shows the part exposing the joinder portion 702 and the elastic hinges 702a and 702b by the solid lines. The joinder portion is formed on the two elastic hinges 702a and 702b. An etching is applied in a desired form so that the joinder portion 702 is connected to the two elastic hinges 702a and 702b. Such connection of the two elastic hinges 702a and 702b in the same joinder portion 702 makes it possible to suppress a deformation of the elastic hinges 702a and 702b. Also, if an external force is applied, the force is distributed by the joinder portion 702 to prevent the force from being applied to directly the elastic hinges 702a and 702b, making them hard to break.

Figure 1C:
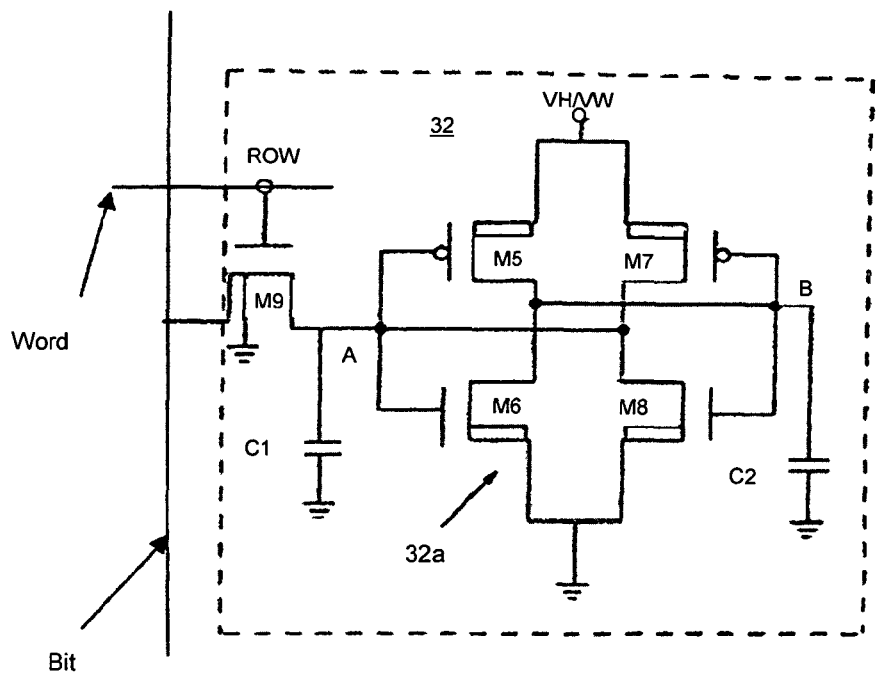
FIG. 1C shows an example of the drive circuit of prior arts.
Figure 1D:
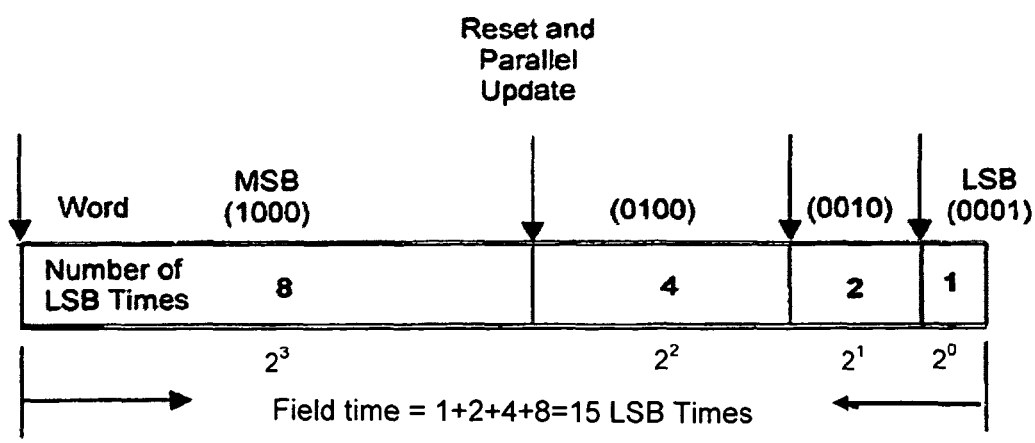
FIG. 1D shows the scheme of Binary Pulse Width Modulation (Binary PWM) of a conventional digital micromirror for generating grayscale.
Figure 2:
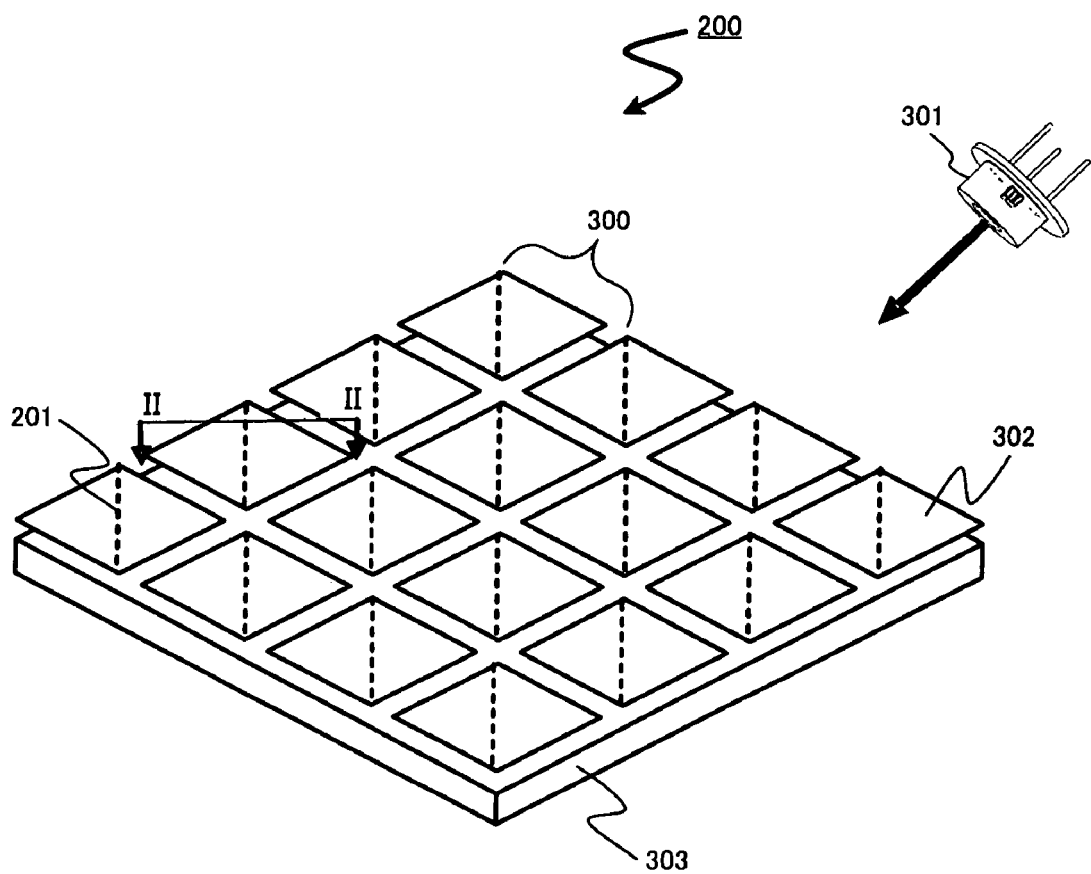
FIG. 2 is a diagonal view of a mirror device arraying, in two-dimension on a device substrate, mirror elements controlling a reflection direction of incident light by deflecting the mirror.
Figure 3A:
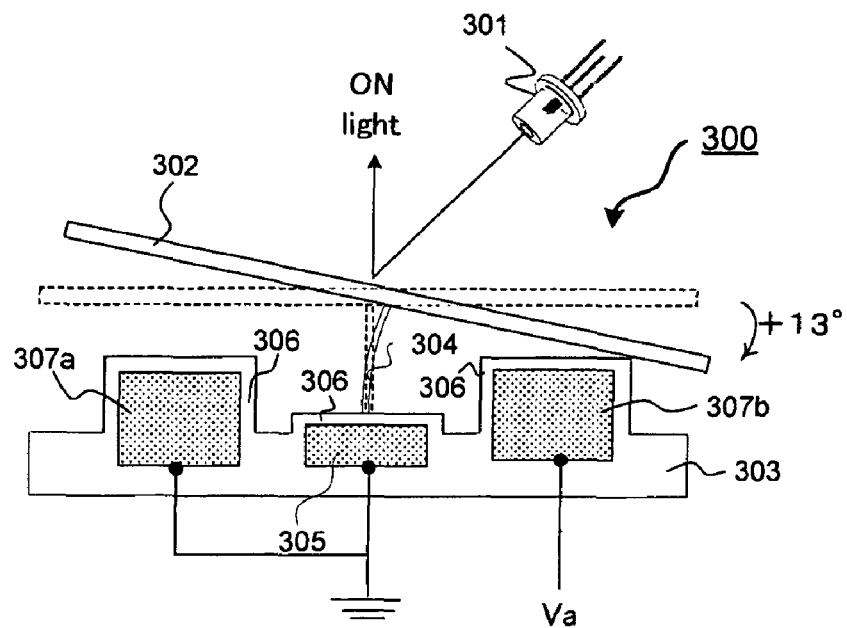
FIG. 3A is a cross-sectional diagram of a mirror element reflecting incident light to a projection optical system by deflecting the mirror.
Figure 3B:
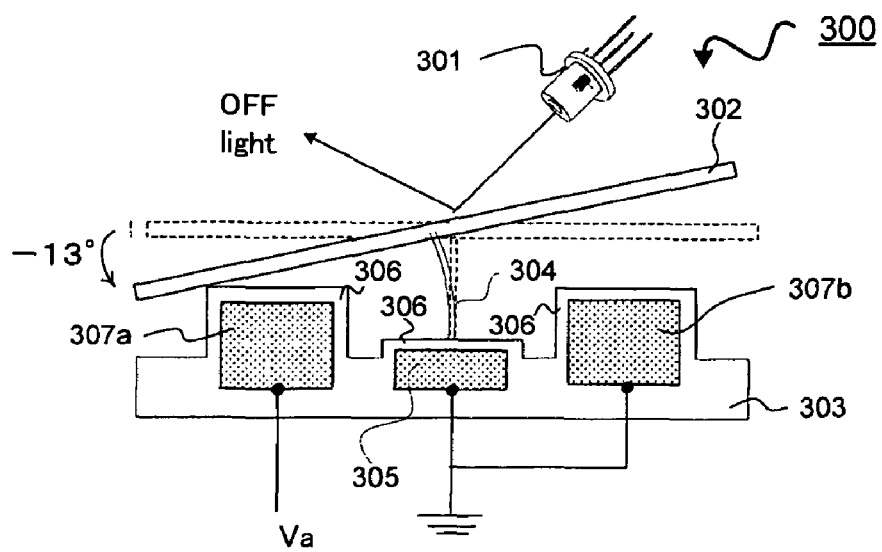
FIG. 3B is a cross-sectional diagram of a mirror element not reflecting the incident light to the projection optical system by deflecting the mirror.
Figure 4:
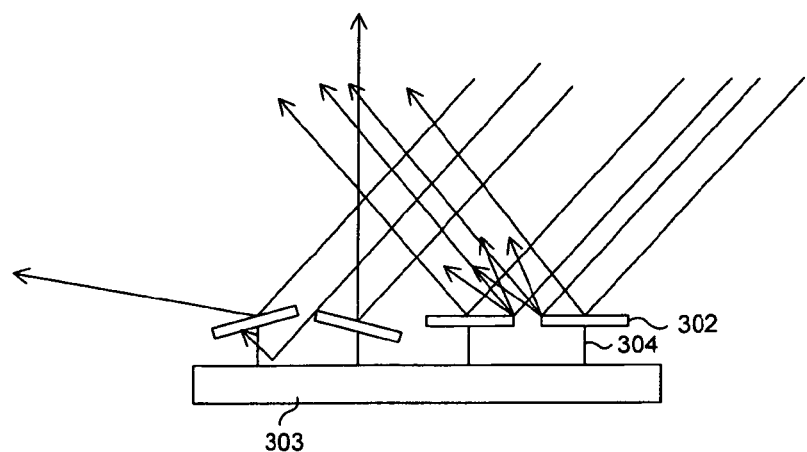
FIG. 4 is a cross-sectional diagram exemplifying a situation of operating each mirror element equipped on the device substrate shown in FIG. 2.
Figure 5:
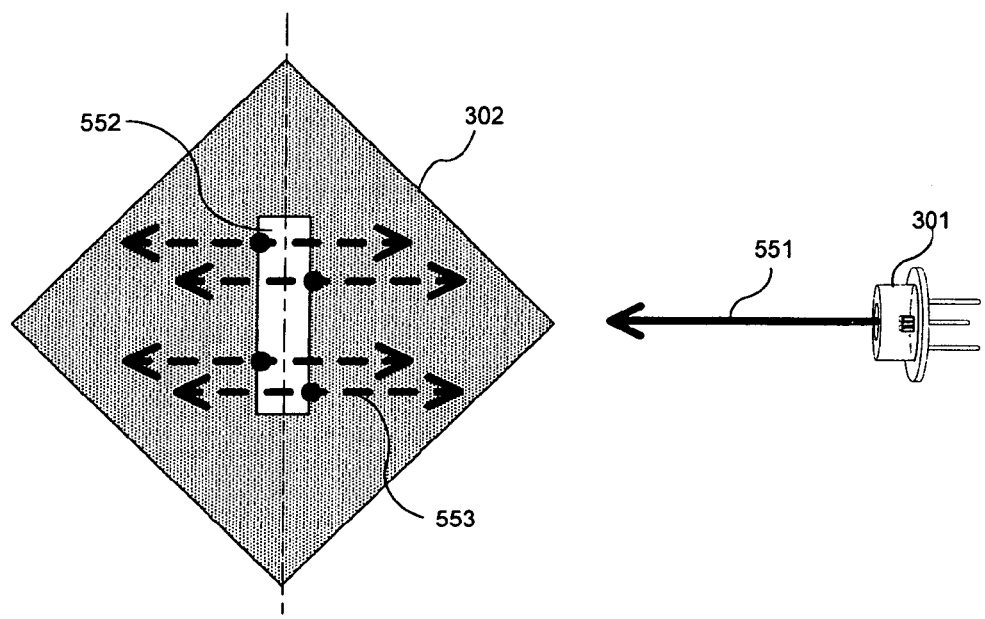
FIG. 5 illustrates a mirror comprising an opening part at the center of the support layer of the mirror, with a reflection member being layered on the opening part.

Meanwhile, the end part of the mirror 701 where the joinder portion 702 does not exist allows a step in nanometer order of a wavelength of light when the mirror is accumulated as noted for FIG. 7B. Therefore, a step is formed on the end part of the mirror 701 in the direction of incident light in a completed mirror 701. Then, the diffraction light of the incident light is generated in the arrow direction shown in FIG. 7B due to the step on the end part of the mirror 701. In the case of the mirror 302 of which a joinder portion does not exist and the elastic hinge is formed at the center of the mirror 302 as shown in FIG. 5, however, a concave or convex step 552 is generated at the center of the mirror 302. And the diffraction light 553 of the incident light from the step of the center part of the mirror 302 is generated in the arrow direction shown in FIG. 5. Comparing these cases, the diffraction light generated in a narrow range (i.e., the range of half the width of the elastic hinge) based on the width of the elastic hinges 702a and 702b on the end parts of the mirror 701 shown in FIG. 7B is harder to be incident to the projection lens than the diffraction light generated from the concave or convex step 552 on the center of the mirror 302 shown in FIG. 5. Because of this, a degradation of the contrast of an image due to the diffraction light can be prevented.

The step 7 of FIG. 10B further accumulates a second sacrifice layer 1003 on the structural body formed on the semiconductor wafer substrate. A part of the space of the etched opening part is filled with the second sacrifice layer 1003. Then, the accumulated the second sacrifice layer 1003 is polished to the extent of exposing the surface of the joinder portion 702.

The step 8 of FIG. 10B accumulates a support layer 706 of the mirror 701 on the top surfaces of the exposed elastic hinges 702a and 702b and joinder portion 702. The support layer 706 is furnished between the mirror 701 and elastic hinges 702a and 702b for reinforcing the conjunction of the mirror layer 710 with the elastic hinge 702 supporting the mirror layer 701, or for preventing a stiction of the mirror onto the stopper 707 contacting the mirror (i.e., the mirror layer) 701 at the time of the mirror deflecting. The support layer 706 may preferably use a material such as titanium, tungsten or the like.

The step 9 of FIG. 10B accumulates the mirror layer 701 on the support layer 706. Note that another layer (such as a barrier layer) may further be provided prior to forming the mirror layer 701. The mirror layer 701 according to the present embodiment is configured to use a material with good reflectivity, such as aluminum, gold, silver and the like.

The step 10 of FIG. 10B further accumulates a second mask layer 1004 on the structural body formed on the semiconductor wafer substrate. The second mask layer 1004 may also be a photoresist for example.

The step 11 of FIG. 10B applies an exposure of a mirror pattern by using a mask for the photoresist that is the second mask layer 1004 for example. It is followed by etching the second mask layer 1004, mirror layer 701 and support layer 706 in accordance with the mirror pattern, separating the mirror layer 701 and support layer 706 into individual mirrors 701 and forming the feature of one mirror 701. In specific, gaps are furnished between the mirrors 701 so that the adjacent mirrors 701 do not contact with each other and also the mirror surface of the mirror 701 is formed into a desired feature.

The step 12 of FIG. 10B removes the first sacrifice layer 1001 by using an etchant. The above described processes enable the drive circuit (not shown in a drawing herein) and address electrodes 703a and 703b to deflect the elastic hinges 702a and 702b and mirror 701 which are formed on the semiconductor wafer substrate 704. The actual production process includes a process (i.e., a dicing process) for dividing the mirror device into mirror devices of a usage size, a process for packaging the individually divided mirror devices, an anti-stiction countermeasure process for preventing from the moving parts (mainly mirrors) from sticking to another member (such as the mirror stopper) and becoming inoperable, and other processes; the description is omitted here, however.

The production method as described above makes it possible to configure the mirror device according to the present embodiment. Note that the mirror device is preferably to be produced by configuring the elastic hinges 702a and 702b of each mirror element to have the length of 2 μm or smaller and the mirror 701 of each mirror element to be an approximate square with one side of 5 μm to 10 μm.

<Mirror Device Production Method 2>

FIGS. 12A through 13B illustrate steps implemented by a production method for a mirror device according to the present embodiment.

This also is applicable to the production method for the mirror devices noted in the embodiments 1, 2 and 3 by applying various changes to a similar process.

Figure 12A:
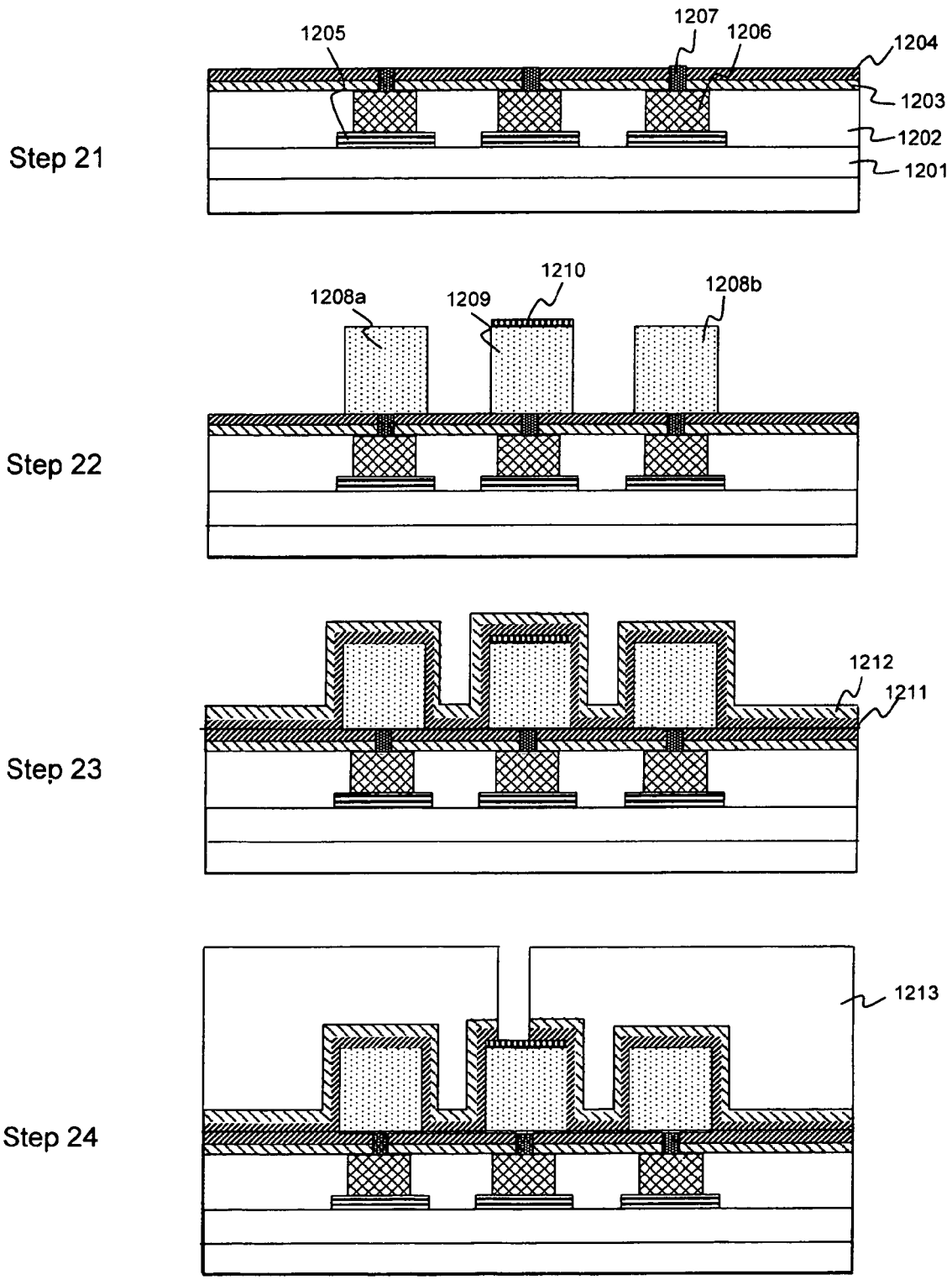
FIG. 12A is a cross-sectional diagram of one mirror element of a mirror device comprising two million mirror elements for describing a production process of the mirror device.
Figure 12B:
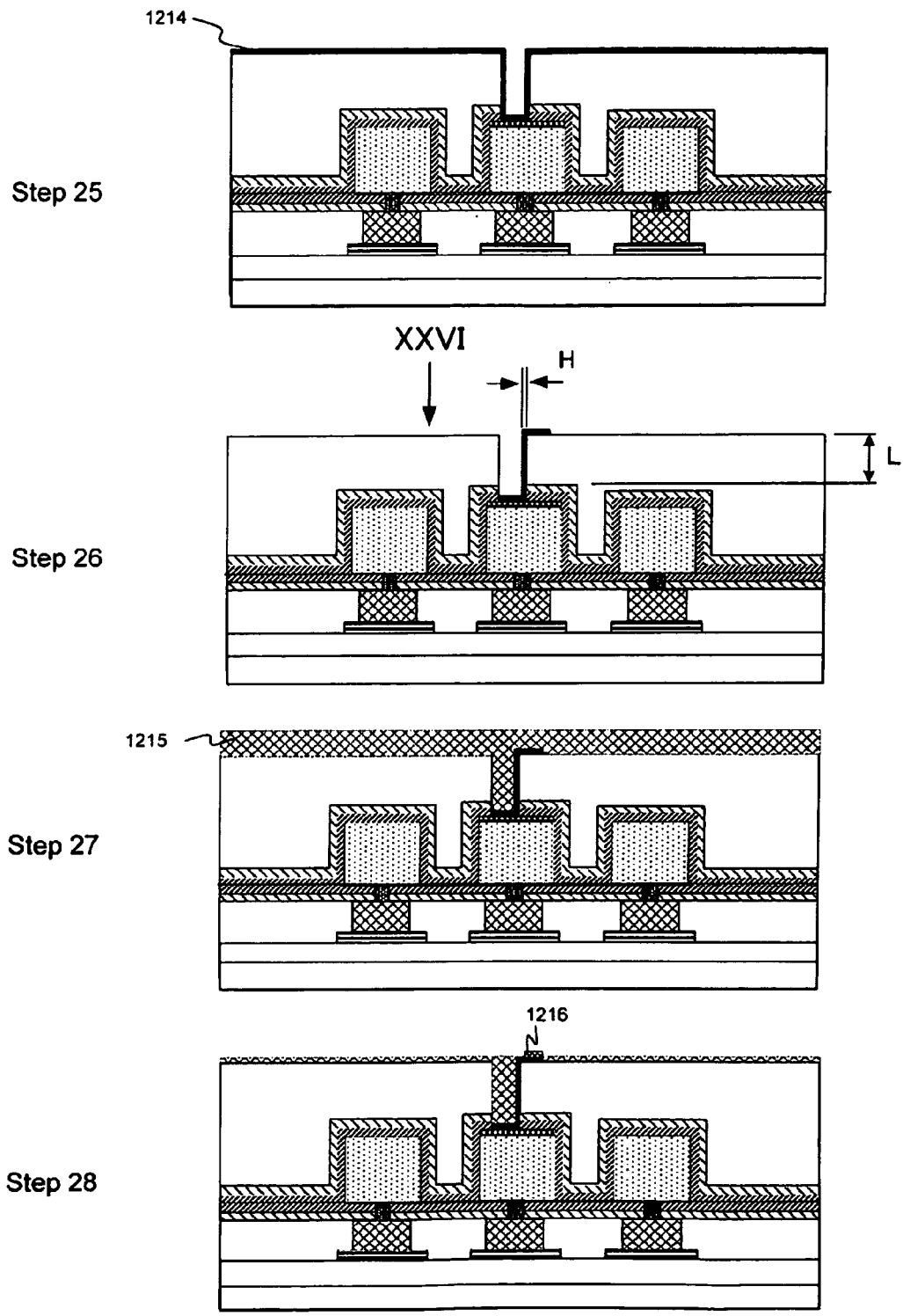
FIG. 12B is a cross-sectional diagram of one mirror element of a mirror device comprising two million mirror elements for describing a production process of the mirror device.
Figure 12C:
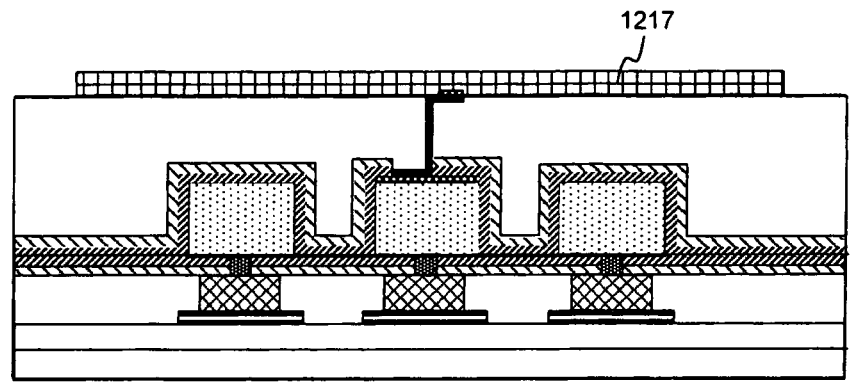
FIG. 12C is a cross-sectional diagram of one mirror element of a mirror device comprising two million mirror elements for describing a production process of the mirror device.
Figure 12C:
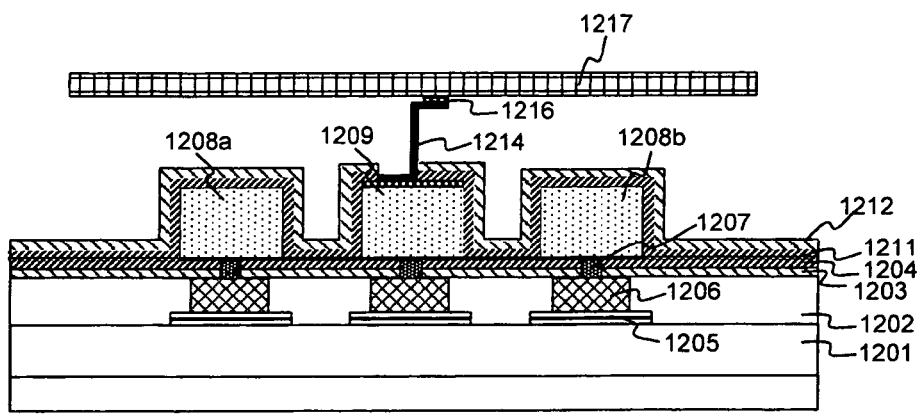

FIGS. 12A through 12C are cross-sectional diagrams of one mirror element of a mirror device comprising two million mirror elements for describing a production process of the mirror device.

The step 21 of FIG. 12A forms the wiring 1205 of a drive circuit for driving and controlling a mirror to be formed later, a first Via 1206 connected to the drive circuit and a second insulation layer 1202 on a first insulation layer in the semiconductor wafer substrate. The processes proceed with processes of forming a second via 1207 on the first via 1206, and forming a first protective layer 1203 and a second protective layer 1204 on the second insulation layer 1202.

The wiring of the drive circuit is preferably an aluminum wiring.

The first via 1206 and second via 1207 are preferably to be constituted by a metal including tungsten and cupper.

Each of the first insulation layer 1201 and second insulating layer 1201 is preferably silicon dioxide ($SiO_2$).

Each of the first protective layer 1203 and second protective layer 1204 is preferably a layer including silicon such as silicon carbide (SiC), amorphous silicon. The present step accumulates silicon dioxide ($SiO_2$) as the insulation layer; silicon carbide (SiC) as the first protective layer 1203; and amorphous silicon as the second protective layer 1204. Here, the thickness of 300 to 1000 angstroms of the silicon carbide (SiC) is accumulated for the first protective layer 1203 and that of 1000 to 3000 angstroms of the amorphous silicon is accumulated for the second protective layer 1204. These layers are for preventing hydrogen fluoride (HF) from corroding the first via 1206; second via 1207 when HF is applied to remove the sacrifice layers in a later process.

An alternative process for securing the electrical connection with the electrodes 1208a, 1208b and 1209 may be to accumulate the first protective layer 1203 and second protective layer 1204 first on the first insulation layer 1202 and put holes in the respective protective layers 1202 and 1204, followed by accumulating the second Via 1207. If aluminum is used for the electrodes 1208a, 1208b and 1209, a direct contact between the amorphous silicon and the aluminum-made electrodes 1208a, 1208b and 1209 results in corrosion of the aluminum electrodes and therefore an equipment of a silicon carbide (SiC) layer between the amorphous silicon and aluminum electrodes is recommended. On the other hand, a forming of the electrodes 1208a, 1208b and 1209 by mixing an impurity, such as silicon, with aluminum, or a provision of a barrier layer using a material other than a SiC layer may be appropriate.

The step 22 of FIG. 12A equips the structural body on the semiconductor wafer substrate with the electrodes 1208a, 1208b and 1209 so as to be electrically conductive with the second via 1207.

The electrodes 1208a, 1208b and 1209 are preferably to be constituted by aluminum for example. The center electrode 1209 (becoming a hinge electrode later) of the present step is an electrode equipped for the elastic hinge and is configured to be the same height as that of the left and right electrodes. The forming of the individual electrodes 1208a, 1208b and 1209 by configuring the same height between the center electrode 1209 and the left and right electrodes 1208a and 1208b as such makes it possible to form the three electrodes 1208a, 1208b and 1209 in the same process. Or it is possible to change the height of the electrodes. Then, a barrier layer 1210, made from tantrum, titanium or the like, is formed on the center electrode 1209. The barrier layer 1210 may comprise two or more layers.

Meanwhile, an appropriate adjustment of the height of the center electrode 1209 makes it possible to determine a setup of the height of the elastic hinge as described later. A setup of the height of the elastic hinge may be determined by adjusting the height of the barrier layer 1210.

The step 23 of FIG. 12A forms a third protective layer 1211 on the structural body of the semiconductor wafer substrate on which the three electrodes 1208a, 1208b and 1209 have been formed and forms a forth protective layer 1212 on the third protective layer 1211.

The third protective layer 1211 and fourth protective layer 1212 are preferably layers including silicon such as silicon carbide (SiC), amorphous silicon. The present step accumulates silicon carbide (SiC) as the third protective layer 1211 and amorphous silicon as the forth-protective layer 1212. Likewise the content noted for the step 21, in the case of the electrodes 1208a, 1208b and 1209 being constituted by aluminum, these layers are formed for prevention of corrosion of the HF that is used in a later process.

The step 24 of FIG. 12A accumulates a sacrifice layer 1213 on the structural body of the semiconductor wafer substrate on which the forth protective layer 1212 is formed on the third protective layer 1211. It is followed by etching the part of the accumulated third protective layer 1211, forth protective layer 1212 and sacrifice layer 1213, in which the elastic hinge is to be formed, to form a hole.

The sacrifice layer 1213 preferably uses a material such as tetraethoxysilane (TEOS).

The present embodiment is configured to put a hole on the center electrode on which an elastic hinge is to be formed. The depth of the hole is determined by the thickness and width of the elastic hinge and by the deflection angle of the mirror. The depth of the hole is preferably to be 0.4 to 1.2 μm. The depth is able to be shallow compare with step 3 of FIG. 10A and yield of production of the elastic hinge is improvement.

The step 25 of FIG. 12B forms the sacrifice layer 1213 and accumulates a hinge layer 1214, which becomes an elastic hinge, on the structural body of the semiconductor wafer substrate of which the hole is put for forming the elastic hinge. The hinge layer 1214 is an amorphous silicon layer or silicon germanium for example.

The hinge layer 1214 is accumulated by making the top surface of the sacrifice layer 1213 using a polishing process. The thickness of the hinge layer 1214 is preferably between 150 and 350 angstroms. The thickness is able to be thin compare with step 4 of FIG. 10A and manufacturing process period of accumulates a hinge layer 1214 is able to reduce.

Meanwhile, the hinge layer 1214 formed on the surface of the hole is preferably to possess an electric conductivity by applying an In-Situ doping (such as arsenic and phosphorus), an ion implanting, a diffusion of metallic silicide such as nickel silicide (NiSi), titanium silicide (TiSi) or such.

The step 26 of FIG. 12B forms a desired feature of the elastic hinge by etching the hinge layer 1214. The mask used for applying the etching is equipped so as to fill the inside of the hole. The elastic force of the elastic hinge 1214 is determined on the basis of the length L of the elastic hinge, the thickness H thereof and the width W thereof.

Figure 13:
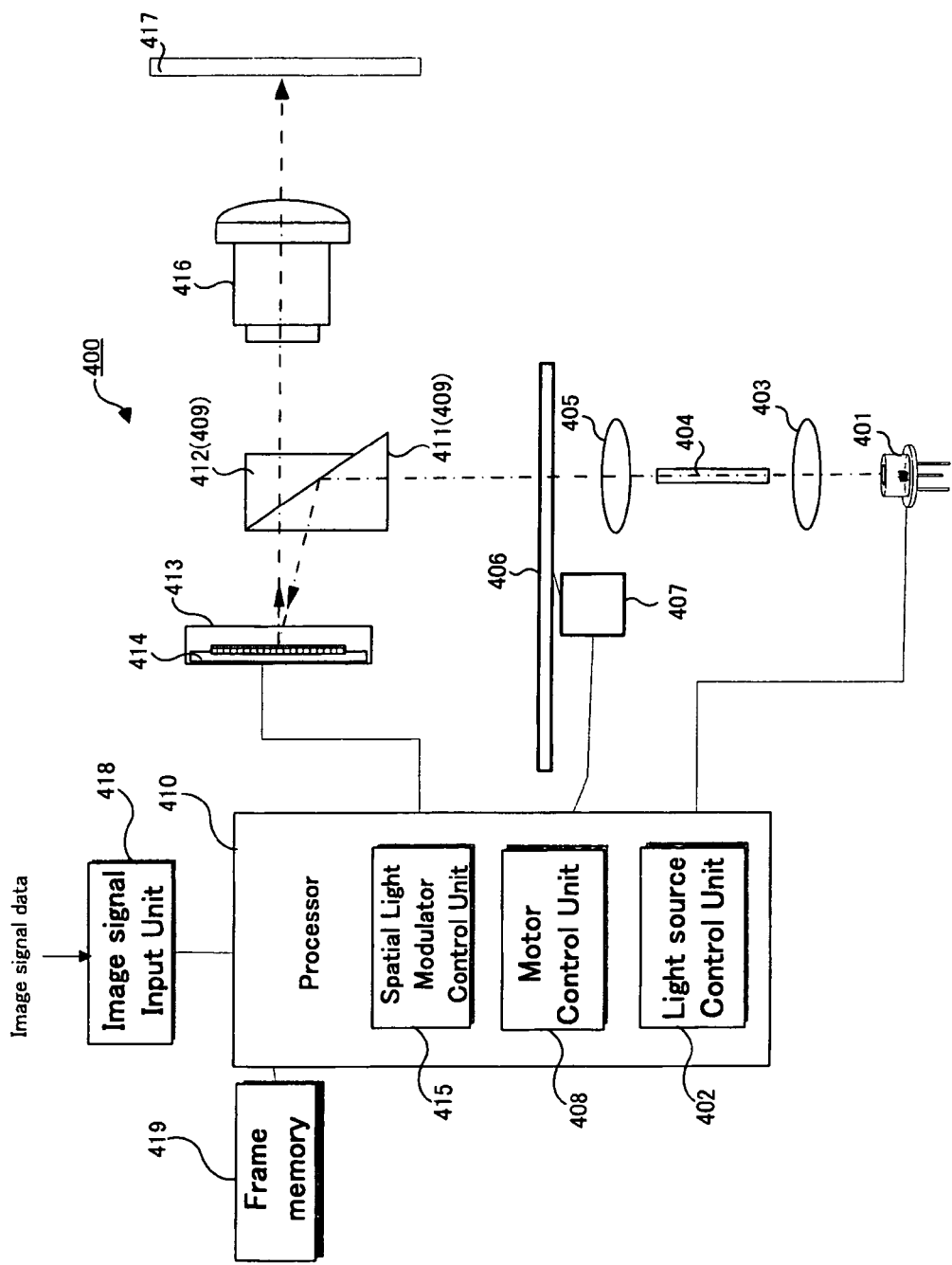
FIG. 13 is a functional diagram for illustrating an image projection system of this invention.
Figure 13A:
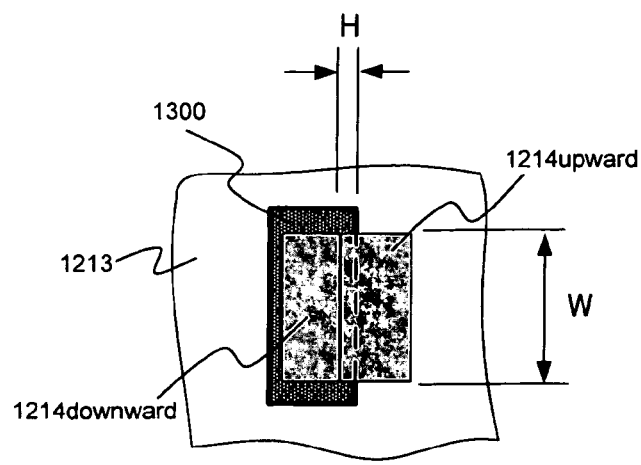
FIG. 13A is a plain view diagram of a mirror element viewing from the arrow direction XXVI in the step 26 of FIG. 12B.

FIG. 13A is a plain view diagram of a mirror element viewing from the arrow direction XXVI of FIG. 12B in the step 26.

The elastic hinge is formed in a hole 1300 provided in the sacrifice layer 1213. A part 1214$_{upward}$ of the elastic hinge left on the sacrifice layer 1213 is joined with the bottom surface of the mirror by way of several layers later. Contrarily, a part 1214$_{downward}$ of the elastic hinge within the hole 1300 under the sacrifice layer 1213 is joined with a later described barrier layer to be formed on the structural body of the semiconductor wafer substrate.

When the elastic hinge 1214 is formed, variations of the thickness and length of the elastic hinge 1214 for individual mirror elements influence greatly the elastic strength. Moreover, there is a possibility of the elastic hinge being deformed after removing the sacrifice layer 1213 due to a residual stress, which has been left at the time of production. Therefore, the elastic hinge is desirably to be formed so as to satisfy the condition of [width W of elastic hinge>length L of elastic hinge]. Particularly, the elastic hinge 1214 is desirably to be standing approximately vertical between the mirror 1217 and the center electrode 1209 and satisfy the relationship of [width of elastic hinge≧length of elastic hinge>thickness of elastic hinge].

In an experiment by setting the length L of the elastic hinge to 1 μm and the width W thereof to 1.2 μm, confirmed is the fact of a mirror 1217 layered on the elastic hinge 1214 being well stabilized.

Here, an alternative configuration may be such that a plurality of elastic hinge is placed for one mirror, with the width W of each elastic hinge being smaller for supporting the mirror. As an example, two elastic hinge of a smaller width than the conventional elastic hinge may be placed at both end parts of one mirror as shown in FIG. 8.

The top surface of the elastic hinge may be equipped with a joinder portion which can be configured to be an area size and/or form similar to those of a later described mirror. The present embodiment is configured to make the joinder portion as small an area size as possible. Such a configuration makes it possible to prevent the mirror from being deformed or warped due to the difference of linear thermal expansion between the mirror and joinder portion. The step 27 of FIG. 12B further accumulates a mask layer 1215 on the structural body of the semiconductor wafer substrate which is formed in a desired feature of the elastic hinge 1214.

The mask layer 1215 is accumulated in a manner to completely cover the joinder portion of the elastic hinge 1214 so as to fill the hole formed for the elastic hinge 1214 and maintain an electrical connection between the elastic hinge and a mirror layer 1217 described later. The mask layer 1215 may use a material such as a photoresist.

The step 28 of FIG. 12B applies a mask layer 1215 of the structural body of the semiconductor wafer substrate on which the mask layer 1215 is formed so as to accumulate a metallic layer 1216 on the joinder portion of the elastic hinge 1214. The process continues with a process of further accumulating a few layers on the joinder portion. In the present step, if the size of the semiconductor wafer substrate is eight inches of diameter, the polishing is preferably carried out in a manner to expose the joinder portion of the elastic hinge 1214 of the respective mirror elements both of which formed on nearby the center part of the semiconductor wafer substrate and the ones formed nearby the end parts thereof.

Even with such a polishing being carrier out, the area sizes and/or height of the parts exposing the joinder portion of the elastic hinge 1214 are actually different between the mirror elements formed nearby the center part of the semiconductor wafer substrate and the ones formed nearby the end parts thereof. In order to eliminate the variation of the height among the individual mirror elements on one hand and secure an electrical connection between the elastic hinge 1214 and mirror 1217 on the other, the metallic layer 1216.

As an example, the metallic layer 1216 is a material including tungsten or titanium; alternatively however, a material including other metal may be accumulated.

If the mirror 1217 is formed by aluminum and if the elastic hinge 1214 is formed by using a silicon material, a barrier layer (not shown in a drawing herein) further layered on top of, and under, the metallic layer 1216 so as not to allow the mirror 1217 to contact with the elastic hinge 1214. Note that the barrier layer may be constituted by two or more layers.

The step 29 of FIG. 12C accumulates the mirror layer 1217 on the structural body of the semiconductor wafer substrate. It is followed by applying an etching to the accumulated mirror layer 1217 for forming a desired feature of the mirror. The mirror layer 1217 is preferably to be formed by a material with high reflectivity of light, such as aluminum.

The present embodiment applies the etching so as to form the individual mirrors in approximate square. One side of the approximate square mirror is desirably between 4 and 10 μm. Further preferably to have the gap of between 0.15 and 0.55 μm between individual mirrors. And the aperture ratio of each mirror element is desirably to be designed about 90%. The etching is followed by layering a protective layer (not shown in a drawing herein) on the entire surface of the structural body on the semiconductor wafer substrate on which the mirror layer has been formed. The protective layer used in this event is the TEOS for example.

It is followed by dicing the mirror element into two-million mirror elements. The aforementioned protective layer is formed for protecting the mirror elements during the dicing.

It is followed by dividing the semiconductor wafer substrate into an individual mirror array on which the two million mirror or more elements have been formed.

The step 30 of FIG. 12C removes the sacrifice layer of the structural body of the semiconductor wafer substrate on which the mirror layer has been formed. If the sacrifice layer is formed with the TEOS, the sacrifice layer is removed by using hydrogen fluoride (HF) and alcohol. An appropriate adjustment of the hydrogen fluoride (HF) and alcohol and the processing time makes it possible to remove the sacrifice layer and residual foreign materials completely. Such a process makes it possible to form an anti-stiction layer on the forth-protective layer 1212 after a dicing process.

Figure 13B:
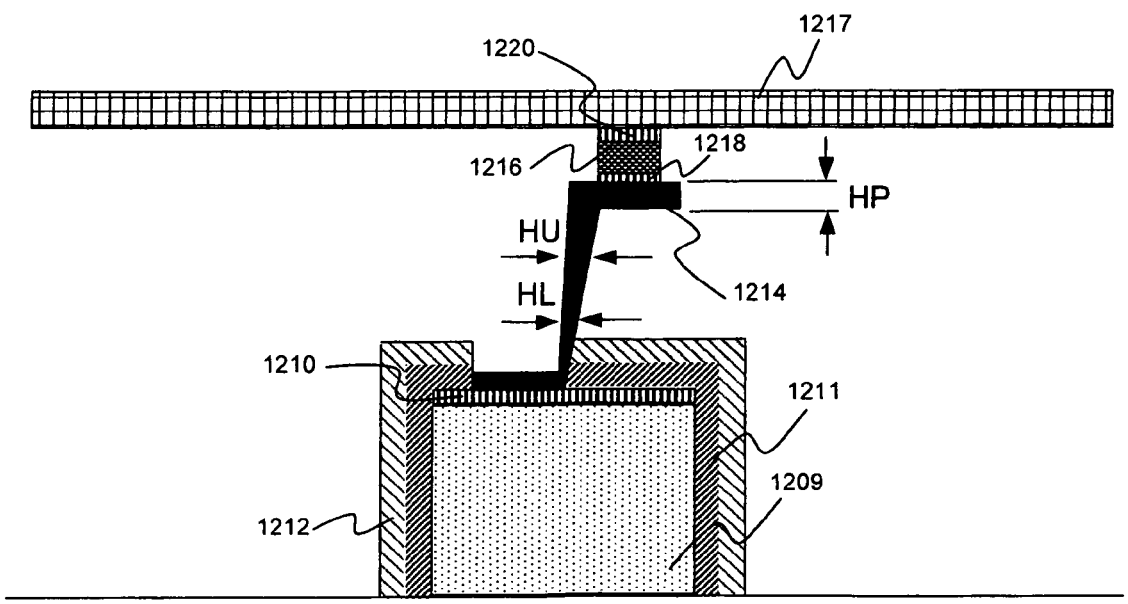
FIG. 13B is a diagram showing an elastic hinge and a mirror constructed on a center electrode of a mirror element of a mirror device formed in the production processes shown in FIGS. 12A through 12C.

FIG. 13B shows the elastic hinge 1214 and mirror 1217 constituted on the center electrode 1209 of the mirror element of the mirror device formed in the production processes shown in FIGS. 12A through 12C.

The barrier layer 1210 is overlaid on the center electrode 1209 on the semiconductor wafer substrate and the barrier layer 1210 is joined with the elastic hinge 1214. The third protective layer 1211 is overlaid on the center electrode 1210 and the forth-protective layer 1212 is further overlaid on the third protective layer 1211.

And the upper joinder part of the elastic hinge 1214, and a barrier layer 1218 is formed on the joinder part. And a metallic layer 1216 is overlaid on the barrier layer 1218, and a barrier layer 1220 is further overlaid on the metallic layer 1216. That is, the top and bottom surface of the metallic layer 1216 is covered with the barrier layers 1220 and 1218, respectively. The barrier layers 1220 and 1218 are connected to the mirror layer 1217. Note that an appropriate adjustment of the joinder part, metallic layer 1216 or barrier layers 1220 and 1218 formed on the top and bottom surfaces of the metallic layer 1216 makes it possible to correct the height for forming the mirror layer 1217. As such, the mirror 1217 is supported by the elastic hinge 1214 formed on the center electrode 1209 of the mirror element, which is produced by the production method according to the present embodiment.

The amorphous silicon of the elastic hinge 1214 is layered by employing the chemical vapor deposition (CVD). In this event, the amorphous silicon layer is formed in a manner to make the thickness to be the smallest in the root part HL of the elastic hinge, increasing the thickness gradually in the center upper part HU of the elastic hinge and the largest in the joining part HP with the joinder layer of the elastic hinge. That is, in the end part of the elastic hinge 1214 close to the center electrode 1209 and the and part of the elastic hinge 1214 close to the mirror 1217, the following relationship is desirably to be satisfied:

[Cross-sectional area size of end part of elastic hinge close to electrode]≦[cross-sectional area size of end part of elastic hinge close to mirror];

An experiment of such an elastic hinge 1214 including silicon has confirmed the fact of the durability being very high as an elastic body and the elastic hinge 1214 not being broken even after the deflection cycles thereof reaching at trillions of times. As such, the mirror element produced by the production method noted in the present specification document is well capable of enduring in an actual usage. Note that the mirror device is preferably to be produced by configuring the length of the elastic hinge 1214 of each mirror element to be 2 μm or smaller and the mirror 1217 of each mirror element to be an approximate square with one side of 10 μm or smaller. Also note that a comprisal of the electrodes 1208a, 1208b and hinge electrode 1210 on the substrate surface makes it possess the convex and concave surfaces.

The next is a description of projection apparatuses comprising mirror devices according to the embodiments 1, 2 and 3. The projection apparatuses include a single-plate projection apparatus and a multi-plate projection apparatus, and the mirror devices according to the embodiments 1, 2 and 3 are applicable to both of the projection apparatuses.

<Single-Plate Projection Apparatus>

Described here is an example of a single-plate projection apparatus comprising a single mirror device put forth in the present embodiment.

Figure 14:
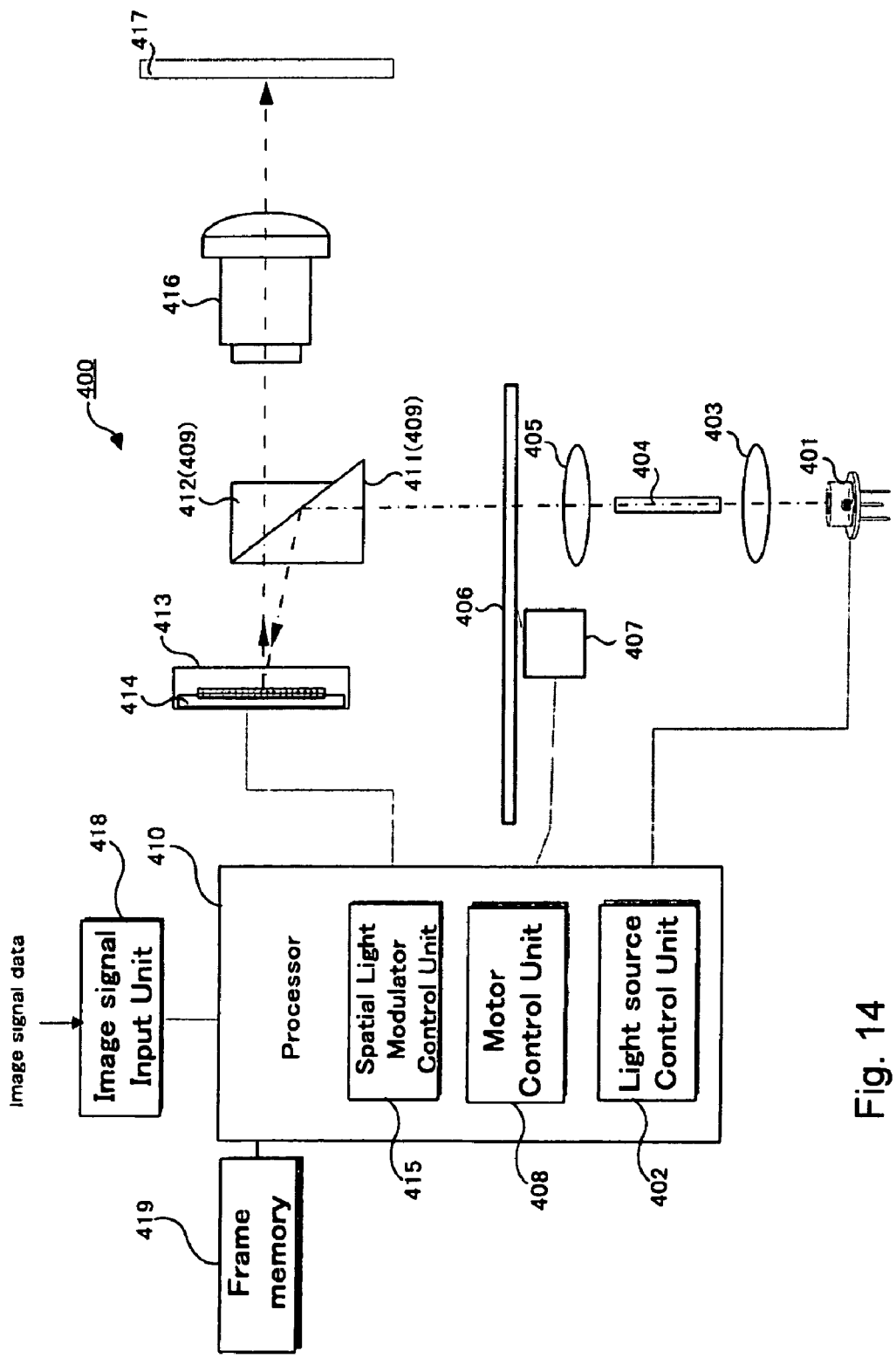
FIG. 14 is a configuration diagram of a single-plate projection apparatus comprising a mirror device according to the present embodiment.

FIG. 14 is a configuration diagram of a single-plate projection apparatus comprising a mirror device according to the present embodiment.

The single-plate projection apparatus comprises the following constituent components.

A light source 401 emits the light for projecting an image. The light source 401 is controlled by a light source control unit 402 comprised by a processor 410. The light source 401 may be an arc lamp light source, a laser light source or a light emitting diode (LED). The light source 401 may even be constituted by a plurality of sub-light sources. The number of the sub-light sources to be lit is controlled by a light source control unit 402, thereby adjusting the light intensity. Also, the light source control unit 402 biasing the position of the sub-light sources to be lit makes it possible to bring forth a locality of the light intensity.

If the light source 401 is constituted by a plurality of laser light sources with different wavelengths, the light source control unit 402 changing over among the individual laser light sources enables a selection of a color of incident light. Therefore, this configuration does not require a color wheel 406 described later. Also it is possible to carry out a pulse emission of light of a laser light source or of light emitting diode (LED) light source.

When using a near-parallel flux of light with a small light dispersion angle, such as a laser light source, the numerical aperture NA of an illumination light flux and of the flux reflecting on the mirror device 414 can be reduced based on the relationship of etendue. By this, while avoiding an interference of the illumination light flux prior to being reflected on the mirror device 414 with the projection light flux after being reflected thereon, these fluxes can be moved close to each other. As a result, the mirror can be downsized and also the deflection angle of the mirror can be smaller. And the making of the deflection angle of mirror smaller by moving the illumination light flux and projection light flux closer to each other makes it possible to shorten the difference of light path lengths between the incident light and reflection light passing through a package 413 and make the difference of a rate of light transmission of the package 413 smaller. That is, larger light quantity of incident light and reflection light enter the mirror array and projection path. Therefore, making the deflection angle of the mirror small by using a laser light source enables a projection of a brighter image.

A condenser lens-1 403 converges the light from the light source 401. A rod integrator 404 uniforms an intensity of light. A condenser lens-2 405 converges the light emitted from the rod integrator 404. A color wheel 406 is constituted by a filter member, which is constituted by a plurality of filters. Each of the individual filters extracts a specific wavelength. As an example, the filter member can be constituted by three filters, i.e., a filter for extracting the light of the wavelength of red, one for extracting the light of the wavelength of green and one for extracting the light of the wavelength of blue. And, each filter of a light-passing path can be changed over by a color wheel drive unit 407 so as to rotate or slide the filter member constituted by the filters. The filter may have a characteristic of polarization. A motor control unit 408 of the processor 410 controls the color wheel drive unit 407. The rotation or slide speeds of the filter are controlled by the color wheel drive unit 407.

A total internal reflection (TIR) prism 409 is constituted by two triangle prisms, i.e., a first prism 411 and a second prism 412. The first prism 411 has the role of totally reflecting the incident light. As an example, the first prism 411 totally reflects the incident light to the light path entering the mirror device. The totally reflected light is modulated by the mirror device and reflected to the second prism 412. The second prism 412 transmits the reflection light which is incident thereto at an angle smaller than a critical angle and which is modulated by the mirror device. The mirror device 414 is housed in a package 413. The mirror device 414 is controlled by a spatial light modulator (SLM) control unit 415 of the processor 410.

A projection lens 416 has the role of enlarging the light reflected and modulated by the Mirror device 414 so as to project the light on a screen 417.

The processor 410, comprising a light source control unit 402, a motor control unit 408 and an SLM control unit 415, is capable of synchronously controlling each of the aforementioned control units by combining them. The processor 410, being connected to an image signal input unit 418, processes image signal data input therefrom. The processor 410, further being connected to the frame memory 419, is capable of transmitting the processed image signal data. The image signal input unit 418 inputs the received image signal data to the processor 410. And the frame memory 419 is capable of accumulating the image signal data of a single screen processed by the processor 410. Such is the constituent members comprised by the single-plate projection apparatus 400 shown in FIG. 14.

The next is a description of the principle of projecting a color image at the single-plate projection apparatus 400 shown in FIG. 14.

In the single-plate projection apparatus 400, the light emitted from the light source 401 enters a filter of the color wheel 406 by way of the condenser lens-1 403; rod integrator 404 and condenser lend 405. The light of a result of extracting only the light of a specific wavelength by a filter of the color wheel 406 enters the first prism 411 of the TIR prism 409. And the light reflected by the first prism 411 of the TIR prism 409 enters the mirror device 414 housed in the package 413. The light reflected on, and modulated by, the mirror element of the mirror device 414 re-enters the TIR prism 409 and transmits itself through the second prism 412 thereof. Then the transmitted light is projected on the screen 417 by way of the projection lens 416.

When projecting an image as such, the light source control unit 402 at the processor 410 controls the quantity of light, or such, of the light source based on the image signal data receiving by way of the image signal input unit 418. The motor control unit 408 is controlled based on the image signal data, and the motor control unit 408 controls the color wheel drive unit 407. And, such as a control for changing over filters of the color wheel 406 is controlled by the color wheel drive unit 407. Furthermore, the SLM control unit 415 controls such as a plurality of light modulation elements of the mirror device 414 based on the image signal data.

The single-plate projection apparatus 400 configured as described above divides a period for displaying one image (i.e., one frame) into sub-frames corresponding to the individual wavelengths of light in relation to the respective wavelengths of light, e.g., a wavelength corresponding to red, one corresponding to green and one corresponding to blue. And the light of each wavelength is illuminated onto the mirror device 414 in accordance with a period of each sub-frame. In this event, the period of each sub-frame, the period of modulating the light of each wavelength at the mirror device 414 and the period of stopping a filter of the color wheel 406 are mutually dependent. A selective reflection of the incident light at the mirror device 414 enables only the light of the individual wavelength reflected to the projection light to be projected onto the screen. And a sequential projection of lights of the individual wavelengths in accordance with the respective sub-frame periods enables a projection of a color image.

The next is a description of an example of a multi-plate projection apparatus comprising a plurality of mirror devices according to the present embodiment.

The multi-plate projection apparatus comprises a plurality of light sources, a plurality of mirror devices and a projection lens.

The light source may preferably be a laser light source or a light emitting diode (LED). A plurality of laser light sources may be equipped, with each light source being independently controlled. The independent control of each light source eliminates a necessity of a color filter by turning on/off a laser light source having a prescribed wavelength. The use of a laser light source enables a pulse emission, which has been difficult to achieve with a mercury lamp.

The next is a description of the configuration and principle of a two-plate projection apparatus, and a three-plate projection apparatus, as examples of multi-plate projection apparatus comprising mirror devices according to the present embodiment.

<Two-Plate Projection Apparatus>

The two-plate projection apparatus is configured to make two mirror devices respond to two groups of light sources, respectively. And one mirror device modulates the light from one group of light source and another mirror device modulates the light from another group of light source. Then, the reflected and modulated light by each of the mirror devices is synthesized, thereby projecting an image.

As an example, when projecting an image with the lights of wavelengths corresponding to three colors, i.e., red light, green light and blue light, the high visibility green light is modulated by one mirror device, and red or blue lights is modulated by another mirror device in sequence or simultaneously, followed by synthesizing the light modulated by each mirror device and projecting an image.

FIGS. 15A through 15D are configuration diagrams of a two-plate projection apparatus comprising two of a mirror device, according to the present embodiment, housed in one package.

The projection apparatus 500 shown in FIGS. 15A through 15D comprises a green laser light source 501, a red laser light source 502, a blue laser light source 503, illumination optical systems 504a and 504b, two triangle prisms 506 and 509, two mirror devices 520 and 530 which are housed in one package 511, a circuit board 508, a joint member 512, a light shield member 513, a light guide prism 514 and a projection optical system 523.

The next is a description of the constituent components of the projection apparatus 500 shown in FIGS. 15A through 15D.

The individual light sources 501, 502 and 503 are laser light sources as described for the single-plate system and capable of performing a pulse emission. They may be alternatively constituted by a plurality of sub-laser light sources. The light source may use two mercury lamps corresponding to the respective mirror devices. In the case of using the mercury lamps, an equipment of a filter 505 allowing a passage of only a light of a specific wavelength while reflecting other light of wavelengths on the surface of synthesizing the reflection light in a prism 510 described later provides a similar effect as a color filter. Alternatively, a wavelength of light may be separated by using a dichroic prism or dichroic mirror, thereby illuminating the mirror device with the light of the separated wavelength.

The illumination optical systems 504a and 504b are optical elements such as collector lenses described for the single-plate projection apparatus, and rod integrators, convex lenses or concave lenses.

The prism 510 of a result of combining two triangle prisms 506 and 509 has the role of synthesizing the reflection lights from the two mirror devices 520 and 530. When the prism 510 synthesizes the reflection lights from the individual mirror devices, it may be appropriate to equip the filter 505, such as dichroic filter, allowing a passage of only the light of a specific wavelength while reflecting the other light of wavelengths on the surface of synthesizing the reflection light in a prism 510.

The filter 505 has the same role as a color filter because of a capability of allowing a passage of only the light of a specific wavelength while reflecting the other light of wavelengths. Meanwhile, when using a laser light source emitting the light having a specific polarization direction, a polarization light beam splitter film separating/synthesizing light by using a difference of polarization direction of light on the surface of synthesizing a reflection light in the prism 510 may be used, or a polarization light beam splitter coating may be applied to the aforementioned surface.

The package 511 is similar to the package, which has been described for the single-plate projection apparatus. The package 511 noted in FIGS. 15A through 15D is configured to be capable of housing two mirror devices 520 and 530 within one package 511. The mirror devices 520 and 530 may be housed in separate packages, however. Note that FIGS. 15A through 15D show the mirror arrays 521 and 531, and device substrates 522 and 532, of the respective mirror devices 520 and 530.

The circuit board 508 is connected to a processor similar to the one described for the single-plate projection apparatus described above. The processor comprises a SLM control unit and a light source control unit. And the processor processes the input image signal data and transmits the processed information to the SLM control unit and light source control unit. The SLM control unit and light source control unit control the mirror device and light source by way of the circuit board 508 based on the processed information. The control of the mirror device can be synchronized with that of the light source. The input of the image signal data to the processor and other activity have been described for the single-plate projection apparatus and therefore the description is omitted here.

The joint member 512 has the role of joining the prism 510 to the package 511. A material used for the joint member 512 includes a fitted glass for example. The light shield member 513 has the role of shielding unnecessary light. A material used for the light shield member 513 includes graphite for example. The projection apparatus 500 shown in FIGS. 15A through 15D is equipped with the light shield member 513 not only on a part of the bottom of the prism 510 but also on the back of the prism 510.

The light guide prism 514 is a prism of a right-angle triangle cone of a result of adhesively attaching the slope face on the front face of the prism 510 with the bottom of the light guide prism 514 facing upward. And the light guide prism 514 is equipped so that the individual light sources 501, 502 and 503, the illumination optical systems 504a and 504b corresponding to the respective light sources and the light axis of the light emitted from the individual light sources 501, 502 and 503 are respectively perpendicular to the bottom of the light guide prism 514. This configuration enables the lights emitted from the individual light sources 501, 502 and 503 to be orthogonal incident to the light guide prism 514 and prism 510. This results in increasing the rate of light transmission of the light on the incidence surface of the light guide prism 514 and prism 510 when the respective lights emitted from the individual light sources 501, 502 and 503 enters the light guide prism 514 and prism 510.

The projection optical system 523 is an optical element for projecting an appropriate image onto the screen. As an example, members such as a projection lens enlarging the light for projecting an image onto the screen is included. Note that, when using both of a light source emitting a polarized light and a polarization beam splitter film, a two-plate projection apparatus can be configured by comprising a ½ wavelength plate or ¼ wavelength plate on the bottom surface of the prism 510. Such is the constituent members comprised by the two-plate projection apparatus 500 shown in FIGS. 15A through 15D.

The next is a description on the principle of projection at the two-plate projection apparatus 500 by referring to FIGS. 15A through 15D.

The projection apparatus 500 lets the green laser light 515 incident from the front direction of the prism 510, followed by letting the red laser light 516 or blue laser light 517 sequentially in a time division and making the green laser light 515 and red laser light 516 or blue laser light 517 be reflected to the inclined surface direction of the prism 510 by means of the two mirror devices 520 and 530 of the present embodiment. Then the green laser light 515 and the red laser light 516 or blue laser light 517 which are reflected on the inclined surface side of the prism 510 are synthesized and the image is projected on the screen by way of the projection optical system 523.

Figure 15A:
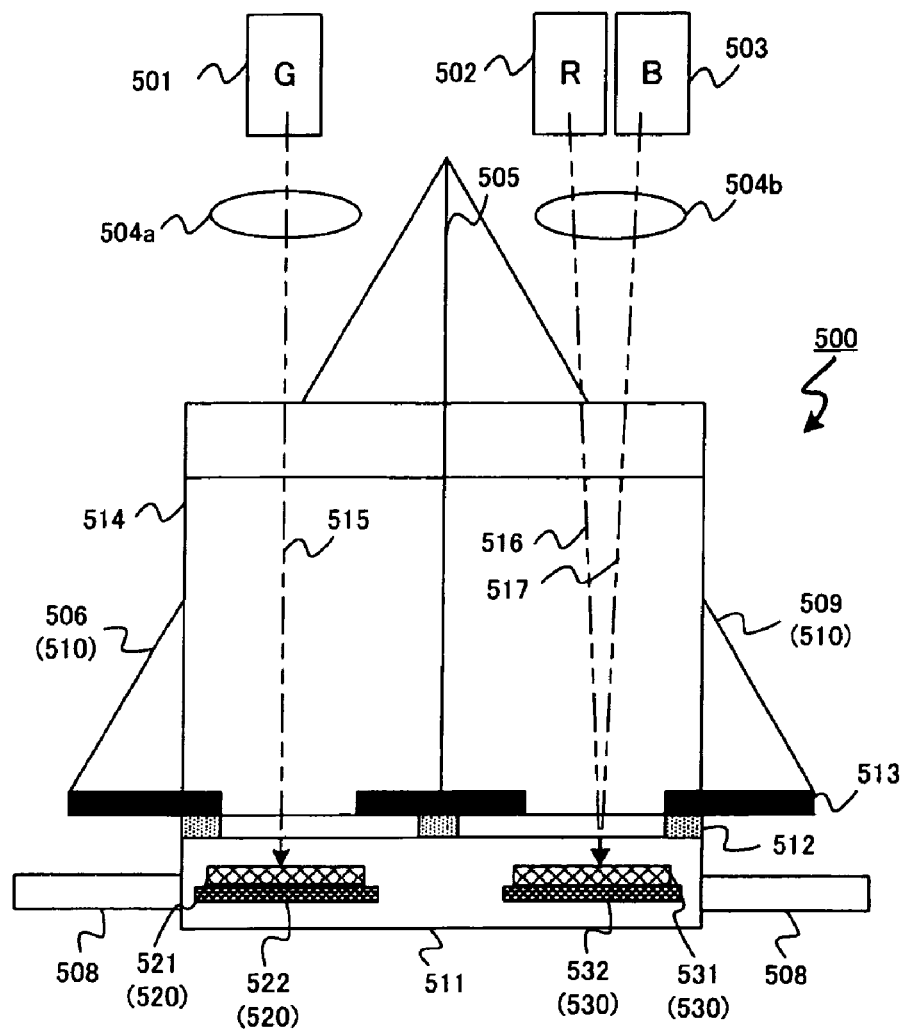
FIG. 15A is a front view diagram of a configuration of a two-plate projection apparatus comprising two mirror devices including the mirror device according to the present embodiment.

FIG. 15A is a front view diagram of a configuration of a two-plate projection apparatus comprising two mirror devices according to the present embodiment.

The next is a description of the principle of projection between the incidence of the individual laser lights 515, 516 and 517 from the front direction of the prism 510 and the reflection of the respective laser lights 515, 516 and 517 to the inclined surface direction of the prism 510 by means of the two mirror devices 520 and 530 by referring to the front view diagram of the two-plate projection apparatus 500 shown in FIG. 15A.

The green laser light 515 and the red laser light 516 or blue laser light 517 emitted respectively from the green laser light source 501 and the red laser light source 502 or blue laser light source 503 go through the illumination optical systems 504a and 504b corresponding to the green laser light 515 and the red laser light 516 or blue laser light 517, and enters the prism 510 by way of the light guide prism 514. Then the green laser light 515 and the red or blue laser light 516 or 517 transmit themselves in the prism 510, and enters the package 511, which is joined, to the bottom of the prism 510.

Then, having passed the package 511, the green laser light 515 and the red or blue laser lights 516 or 517 enter the two mirror devices 520 and 530 which are housed in a single package 511 and which correspond to the individual laser lights 515, 516 and 517. Having been modulated at the respective mirror devices 520 and 530, the individual laser lights 515, 516 and 517 are reflected to the inclined surface direction of the prism 510.

Figure 15B:
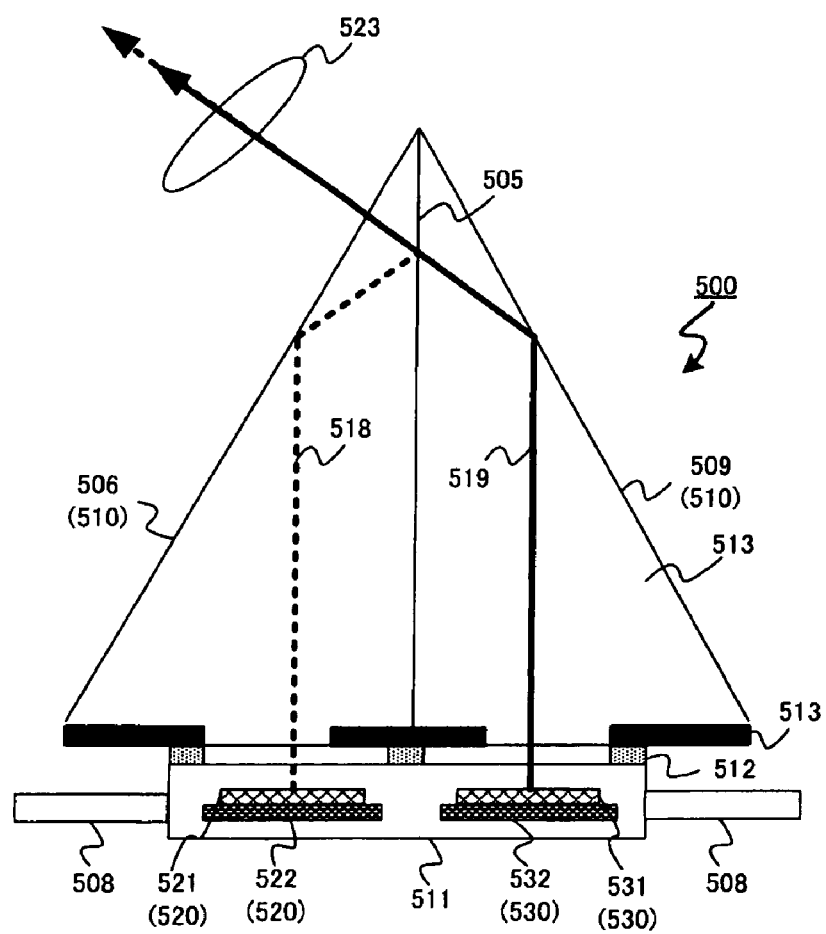
FIG. 15B is a rear view diagram of a configuration of the two-plate projection apparatus shown in FIG. 15A.

The next is a description of the principle of projection starting from the reflection of the individual laser lights 515, 516 and 517 at the respective mirror devices 520 and 530 to the projection of an image by referring to the rear view diagram of the two-plate projection apparatus 500 shown in FIG. 15B.

FIG. 15B is a rear view diagram of a configuration of a two-plate projection apparatus comprising two of a mirror device according to the present embodiment.

A green laser ON light 518 and a red or blue laser ON light 519 reflected to the inclined surface direction of the prism 510 by means of the respective mirror devices 520 and 530 in the ON state are re-transmitted through the package 511, thus entering the prism 510. Then, the green laser ON light 518 and the red or blue laser ON light 519 are respectively reflected on the inclined surface of the prism 510. Then the green laser ON light 518 is re-reflected on the film 505 allowing a passage of only a light of a specific wavelength while reflecting the light of other wavelengths. Meanwhile, the red or blue laser ON light 519 is transmitted through the film 505. Then, the green laser ON light 518 and the red or blue laser ON light 519 are synthesized on the same optical path and incident together to the projection optical system 523, thereby projecting a color image. Note that the optical axes of the respective ON lights 518 and 519 emitted to the projection optical system 523 from the prism 510 are preferably to be perpendicular to the emission surface of the prism 510.

Therefore, the configuration as described above enables a projection of image by using the two-plate projection apparatus 500 comprising two of the mirror device described above.

Figure 15D:
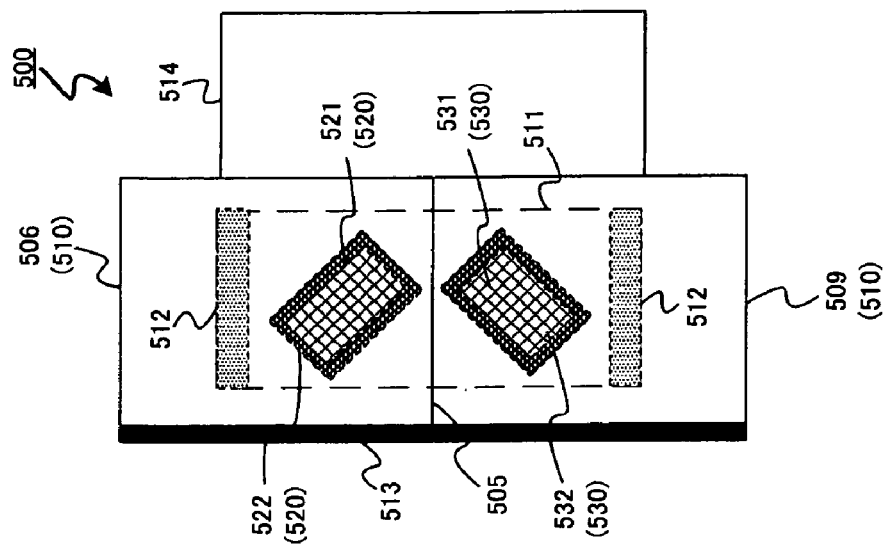
FIG. 15D is a plain view diagram of a configuration of the two-plate projection apparatus shown in FIG. 15A.
Figure 15C:
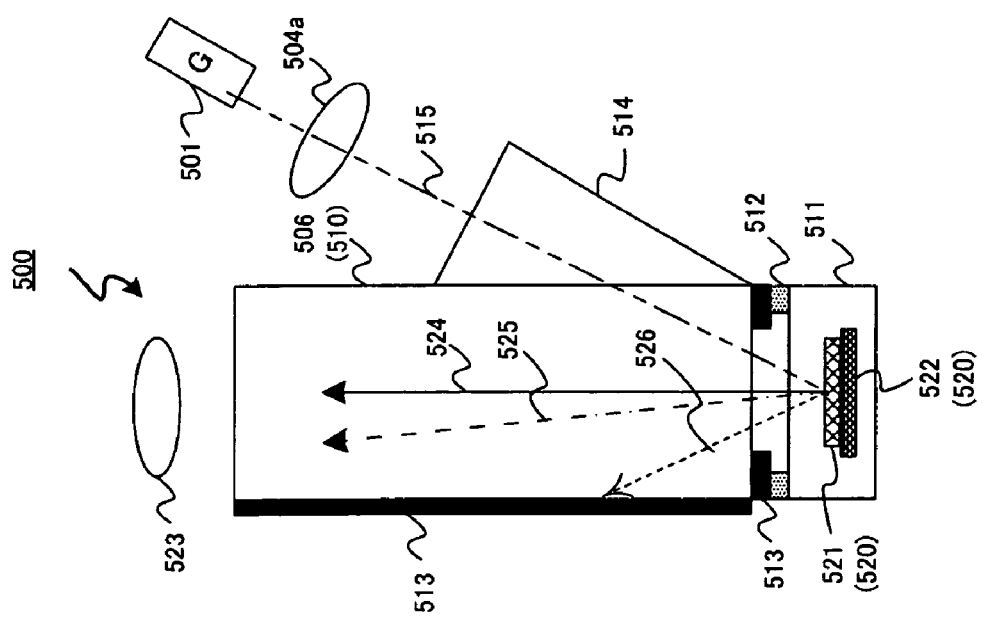
FIG. 15C is a side view diagram of a configuration of the two-plate projection apparatus shown in FIG. 15A.

FIG. 15C is a side view diagram of a configuration of a two-plate projection apparatus comprising two of the mirror device described above.

The green laser light 515 emitted from the green laser light source 501 enters the light guide prism 514 perpendicularly by way of the illumination optical system 504a. Having been transmitted through the light guide prism 514, the green laser light 515 transmits itself through the prism 510 joined with the light guide prism 514 and enters the mirror array 521 of the mirror device 520 housed in the package 511.

The mirror array 521 reflects the incident green laser light 515 by the deflection angles of the mirror in either of the ON state in which the entire reflection light enters the projection optical system 523, of the intermediate light state in which a portion of the reflection light enters the projection optical system 523 or of the OFF light state in which none of the reflection light enters the projection optical system 523. A green laser light 524 selecting the ON light state is reflected on the mirror array 521, and thus the entire light enters the projection optical system 523.

Meanwhile, a laser light 525 selecting the intermediate state is reflected on the mirror array 521, and thus a portion of the light enters the projection optical system 523. And a laser light 526 selecting the OFF light is reflected by the mirror array 521 toward the light shield layer 513 featured on the back surface of the prism 510. And the reflected laser light 526 is absorbed in a light shield layer 513. By this, the green laser lights by the ON light in the maximum quantity of light, by the intermediate light in the intermediate quantity of light between the ON light and OFF light, or by the OFF light in the zero quantity of light are incident to the projection optical system 523. Note that the making of the deflection angle of the mirror stay between the ON light state and OFF light state makes it possible to create an intermediate light state. And the making of the mirror in a free oscillation as described above repeats the deflection angles of the mirror at a deflection angle constituting the ON state, at the angle constituting the intermediate state and at the angle constituting the OFF state. Here, a control of the number of free oscillations makes it possible to adjust a quantity of light incident to the projection optical system 523. As such, the generation of a quantity of light in the intermediate state enables the projection of an image with a high grade of gray scale.

It is possible to carry out a similar process on the reverse surface, that is, on the side having the red laser light source 502 and blue laser light source 503.

FIG. 15D is a plain view diagram of a two-plate projection apparatus comprising two of a mirror device according to the present embodiment.

The light of an OFF light state can be absorbed by the light shield layer 513 on the back without being reflected on the inclined surface of the prism 510 by placing the individual mirror devices 520 and 530 so as to be 45 degrees in relation to the four sides of the outer circumference of the package 511 on the same horizontal plane as shown in FIG. 15D.

<Three-Plate Projection Apparatus>

The next is a description on a three-plate projection apparatus.

The three-plate projection apparatus makes three mirror devices respond to the respective lights of three groups of light sources and makes the individual mirror devices modulate the individual lights from the respective light sources. Then the individual lights modulated by the respective mirror devices are synthesized for projecting an image.

As an example, when projecting an image by the lights of three colors, i.e., red light, green light and blue light, the individual lights are continuously modulated by the respective mirror devices and the modulated individual lights are synthesized, thereby projecting a color image.

Figure 16:
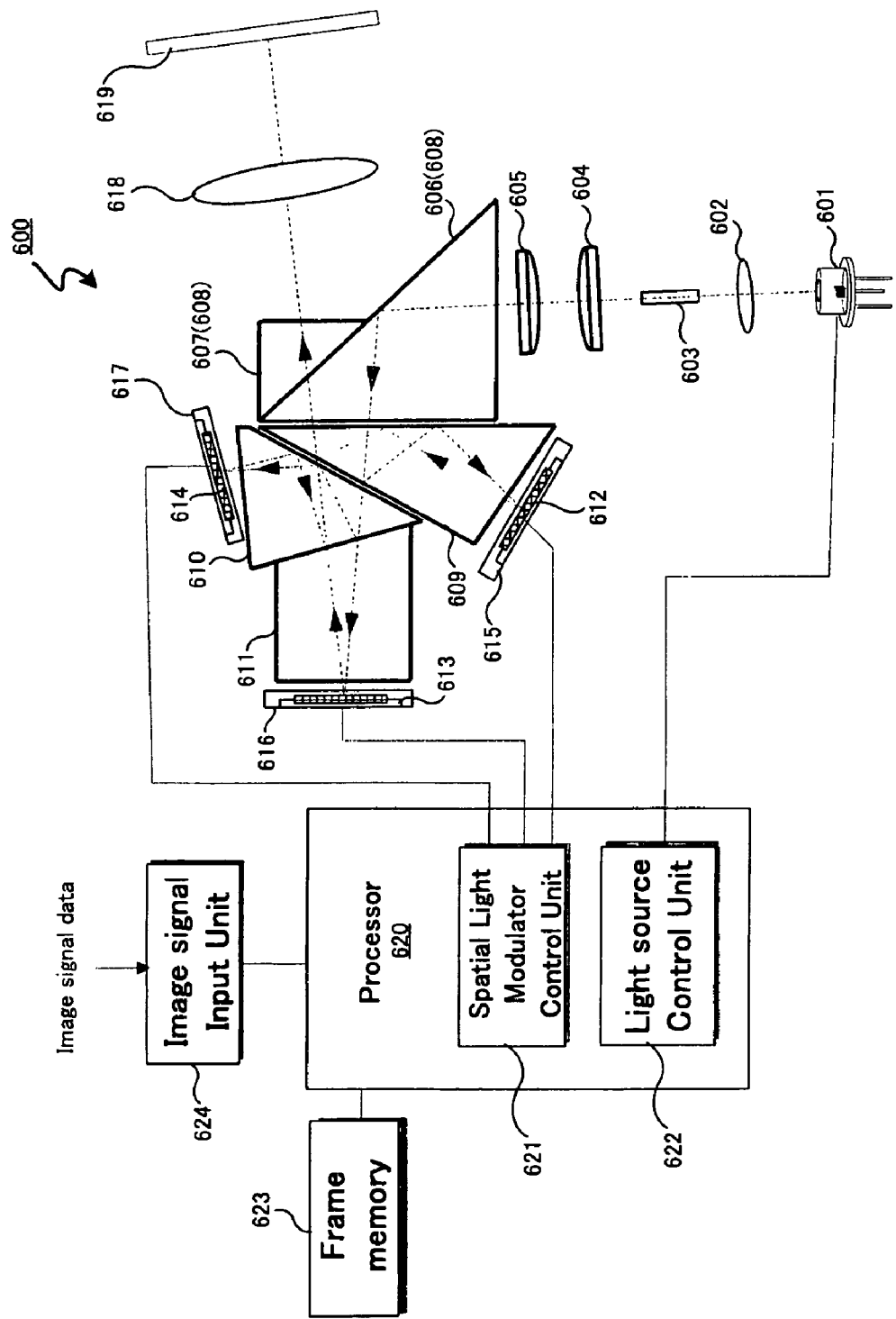
FIG. 16 is a configuration diagram of a three-plate projection apparatus comprising three mirror devices including the mirror device according to the present embodiment.

FIG. 16 is a configuration diagram of a three-plate projection apparatus comprising three of a mirror device, according to the present embodiment, housed in the respective packages.

The projection apparatus 600 shown in FIG. 16 comprises a light source 601, a condenser lens-1 602, a rod integrator 603, a condenser lens-2 604, a condenser lens-3 605, a TIR prism 608, a first dichroic prism 609, a second dichroic prism 610, a third prism 611, individual mirror devices 612, 613 and 614, and individual packages 615, 616 and 617 housing the respective mirror devices 612, 613 and 614 and a projection lens 618.

The next is a description of constituent members of the projection apparatus 600 shown in FIG. 16.

The light source 601 may be a mercury lamp source, a laser light source, an LED, or such, likewise the light source described for the single-plate projection apparatus and two-plate projection apparatus describe above. The configuration and operation of the light source, such as the sub-light source and/or pulse emission, are similar to the light source for the projection apparatus described above and therefore the description is omitted here.

The condenser lens-1 602, rod integrator 603, condenser lens-2 604 and condenser lens-3 605 are similar to those described for the single plate projection apparatus and the condenser lens-1 602, condenser lens-2 604 and condenser lens-3 605 have the role of focusing the light. Meanwhile, the rod integrator 603 has the role of evening out a light intensity.

The TIR prism 608 is similar to the prism described for the single-plate projection apparatus described above and therefore the description is omitted here. Note that the TIR prism 608 used for the three-plate projection apparatus shown in FIG. 16 is constituted by a first prism 606 and a second prism 607.

The first dichroic prism 609 and second dichroic prism 610 are prisms letting only the light of a specific wavelength pass while reflecting the light of other wavelengths. And the third prism 611 is a common prism. Note that the first dichroic prism 609 and second dichroic prism 610 may be configured by respective dichroic mirrors.

As an example, FIG. 16 shows the case of configuring the first dichroic prism 609 as a prism reflecting only the light of the wavelength equivalent to red while letting the light of other wavelengths pass and the second dichroic prism 610 as one reflecting only the light of the wavelength equivalent to blue while letting the light of other wavelengths pass. And the drawing shows the case of configuring the third prism 611 as one making the light of the wavelength equivalent to green travel straight.

The individual packages 615, 616 and 617 house the respective mirror devices 612, 613 and 614 according to the present embodiment.

The projection lens 618 has the role of enlarging individual lights synthesized after the individual lights are reflected and modulated at the respective mirror devices 612, 613 and 614.

A processor 620 is basically similar to the one described for the single plate projection apparatus, and comprises a spatial light modulator control unit 621 and a light source control unit 622. And it processes the input image signal data as described for the single plate projection apparatus.

The spatial light modulator control unit 621, being basically similar to the one described for the single plate projection apparatus, is connected to the individual mirror devices 612, 613 and 614. And it is capable of controlling the individual mirror devices 612, 613 and 614 either independently or synchronously based on the image signal data processed by the processor. It is also capable of controlling the individual mirror devices 612, 613 and 614 synchronously with other constituent members.

The light source control unit 622, being similar to the one described for the single plate projection apparatus, is connected to the light source 601 and capable of controlling the light intensity of the light source, the number of sub-light sources to be lit and such based on the image signal processed by the processor. Frame memory 623 and an image signal input unit 624 are similar to the ones described for the single plate projection apparatus and therefore the description is omitted here. Such are the constituent members comprised by the three-plate projection apparatus 600 shown in FIG. 16.

The next is a description of the principle of projection of a color image at the three-plate projection apparatus 600 shown in FIG. 16.

In the three-plate projection apparatus 600, the light output from the light source 601 is transmitted through condenser lens-1 602, rod integrator 603, condenser lens-2 604, condenser lens-3 605 in sequence and incident to the first prism 606 of the TIR prism 608 at a critical angle or more. Then, the incident light is totally reflected by the first prism 606 of the TIR prism 608. The totally reflected light enters the first dichroic prism 609. And only the light of the wavelength equivalent to red, among the totally reflected light, is reflected, while the light of other wavelengths are passed, on the emission surface for light of the first dichroic prism 609 and/or on the incident surface for light of the second dichroic prism 610. Then, as for the light incident to the second dichroic prism 610, only the light of the wavelength equivalent to blue, among the incident light, is reflected, while the light of other wavelength, that is, the light equivalent to green, is passed on the light emission surface of the second dichroic prism 610 and/or the light incident surface of the third prism 611.

The light from which the light of wavelengths equivalent to blue and red are removed which enters the third prism 611, that is, the light equivalent to green travels straight in the third prism 611. Then, the light dispersed to each wavelength is incident to the packages 615, 616 and 617, respectively, which house the respective mirror devices 612, 613 and 614 that are placed on the respective sides of the first dichroic prism 609, second dichroic prism 610 and third prism 611.

The individual lights transmitted through the packages 615, 616 and 617 enter the respective mirror devices 612, 613 and 614 according to the present embodiment. Here, the individual mirror devices 612, 613 and 614 are mutually independently controlled by the spatial light modulator control unit 621 so as to respond to the respective lights based on the image signal processed by the processor 620. The individual mirror devices 612, 613 and 614 modulate, and reflect, the incident respective lights. Then, the light equivalent to the wavelength of red, reflected by the mirror device 612, re-enters the first dichroic prism 609. Also, the light equivalent to the wavelength of blue, reflected by the mirror device 614, re-enters the second dichroic prism 610. And the light equivalent to the wavelength of green, reflected by the mirror device 613 re-enters the third prism 611.

The light equivalent to the wavelength of red, re-entering the first dichroic prism 609, and the light equivalent to the wavelength of blue, re-entering the second dichroic prism 610, repeat some numbers of reflections in the respective prisms 609 and 610. Then, the light equivalent to the wavelength of blue overlaps its optical path with that of the light equivalent to the wavelength of green, re-entering the second dichroic prism 610 from the third prism 611, thereby being synthesized. Then, the light synthesized with the wavelengths equivalent to green and blue enters the first dichroic prism 609 from the second dichroic prism 610. Then, the light equivalent to the wavelength of red overlaps its optical path with that of the light equivalent to the wavelengths of green and blue, entering the first dichroic prism 609 from the second dichroic prism 610, thereby being synthesized.

The light of a result of synthesizing the individual lights modulated by the respective mirror devices 612, 613 and 614 enters the second prism 607 of the TIR prism 608 at the angle smaller than the critical angle.

Then, the synthesized light is transmitted through the second prism 607 of the TIR prism 608 and is projected to the screen 619 by way of the projection lens 618. As such, a color image can be projected at the three-plate projection apparatus.

In such a configuration, as compared to the single-plate image display system described above, since each light of the primary colors is displayed at all times, there will be no visual problem such as the so-called color breakup. Furthermore, an effective use of the emitted light from the light source provides in principle a bright image. Such is a description of a projection apparatus comprising a mirror device(s) according to the present embodiment.

As such, the present specification document has described the mirror device comprising a plurality of electrodes equipped on a substrate, a hinge connected to at least one of the electrodes, a mirror connected to the hinge and corresponding to at least one of the electrodes, in which a barrier layer is comprised between the hinge and mirror, and/or between the hinge and electrode. Also noted is the mirror device production method for producing such-configured mirror device. Further noted is the projection apparatus comprising such-configured mirror device.

Various alternations and modifications have no doubt become apparent to those skilled in the art after reading the above disclosure. Accordingly, it is intended that the appended claims be interpreted as covering all alternations and modifications as falling within the spirit and scope of the invention. Although the present invention has been described by exemplifying the presently preferred embodiments, it shall be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the invention.

What is claimed is:

1. A mirror device, comprising:
a plurality of electrodes disposed on a substrate;
a hinge connected to at least one of the electrodes and the hinge stands on said substrate extending along substantially a vertical direction from the substrate; and
said hinge supports a mirror disposed on top of said hinge along substantially a horizontal direction wherein a cross sectional area of said hinge near the electrode is less than a cross sectional area of said hinge near said mirror.

2. The mirror device according to claim 1, wherein:
a length of the hinge is approximately 2 μm or smaller, and
the mirror is substantially a square mirror wherein each side of said square mirror having a length approximately 10 μm or smaller.

3. A projection apparatus comprising a mirror device including a plurality of mirror elements for reflecting an incident light projected from a light thereto wherein:
the mirror device further comprises a mirror disposed on top of and supported on a vertical hinge extending substantially along a vertical direction from a substrate; and
a hinge electrode disposed on the substrate and electrically connected to the hinge, and
a control circuit including a capacitor placed inside the substrate, and
an electrode disposed inside said substrate under a top surface of said substrate and connected to the control circuit.

4. The projection apparatus according to claim 3, wherein:
a length of the hinge is approximately 2 μm or smaller, and
the mirror is substantially a square mirror wherein each side of said square mirror having a length approximately 10 μm or smaller.

5. The projection apparatus according to claim 3, wherein:
the surface of the electrode and the surface of the hinge electrode having approximately a height from a top surface of said substrate.

6. The projection apparatus according to claim 3, wherein:
the surface of the electrode comprises a protective layer composed of silicon.

7. The projection apparatus according to claim 3, wherein:
the light source is a laser light source.

8. The projection apparatus according to claim 3, further comprising:
a barrier layer disposed between the hinge and mirror, and/or between the hinge and the electrode.

9. The projection apparatus according to claim 3, comprising:
at least two electrodes disposed near said hinge and at least one of said two electrode is disposed on the substrate.

10. The projection apparatus according to claim 3, wherein:
a top surface of the mirror comprising a surface structure with a step having a depth and height relative to said top surface of the mirror wherein said depth or height are substantially smaller than a wavelength of said incident light projected from the light source.

11. The projection apparatus according to claim 3, wherein:
at least a part of the electrode is formed as a convex electrode relative to a top surface of the substrate, and
the deflection angle of the mirror is maintained constant by configuring an electrode as a stopper for contacting said mirror thus prevent said mirror from further deflections.

12. The projection apparatus according to claim 3, wherein:
said hinge supports a mirror disposed on top of said hinge along substantially a horizontal direction wherein a cross sectional area of said hinge near the electrode is less than or equal to a cross sectional area of said hinge near said mirror.

13. The projection apparatus according to claim 3, wherein:
said hinge supports a mirror disposed on top of said hinge along substantially a horizontal direction wherein a width of said hinge is greater than or equal to a length of said hinge and said length of said hinge is greater than a thickness of said hinge.

* * * * *